(12) United States Patent
Rogers

(10) Patent No.: US 9,005,536 B1
(45) Date of Patent: Apr. 14, 2015

(54) APPARATUS AND METHOD FOR CONVERSION OF SOLID WASTE INTO SYNTHETIC OIL, GAS, AND FERTILIZER

(71) Applicant: ARK Power Dynamics, LLC, Vero Beach, FL (US)

(72) Inventor: Michael W. Rogers, El Dorado, AR (US)

(73) Assignee: ARK Power Dynamics, LLC, Vero Beach, FL (US)

( * ) Notice: Subject to any disclaimer, the term of this patent is extended or adjusted under 35 U.S.C. 154(b) by 0 days.

(21) Appl. No.: 14/454,414

(22) Filed: Aug. 7, 2014

Related U.S. Application Data

(60) Provisional application No. 61/986,997, filed on May 1, 2014.

(51) Int. Cl.
*B01J 19/08* (2006.01)
*C05F 3/02* (2006.01)
(Continued)

(52) U.S. Cl.
CPC . *C05F 3/02* (2013.01); *C10B 49/04* (2013.01); *C10B 53/00* (2013.01); *C10G 1/00* (2013.01); *C01B 3/02* (2013.01); *C05F 3/06* (2013.01)

(58) Field of Classification Search
CPC ............ C10J 3/30; C10J 3/32; C10J 3/34; C10J 3/26; C10J 3/42; H01M 4/8652; H01M 4/9066; Y02E 60/525; Y02E 60/56; C10K 1/08; B01D 53/14; C01B 3/22; C05F 3/02; C05F 3/06; C10B 49/04; C10B 53/00; C10B 3/02; C10G 1/00
USPC .......................................................... 422/186
See application file for complete search history.

(56) References Cited

U.S. PATENT DOCUMENTS 3,333,927 A 8/1967 Boddour
4,472,172 A 9/1984 Sheer et al.
(Continued)

FOREIGN PATENT DOCUMENTS

WO 2004/087619 A2 10/2004
WO 2007/047063 A2 4/2007
WO 2013067532 A1 5/2013

OTHER PUBLICATIONS

"Poultry Production and Environmental Stewardship", Environmental Protection Agency Notice EPA 305-F-03-002, Apr. 2003.
(Continued)

*Primary Examiner* — Xiuyu Tai
(74) *Attorney, Agent, or Firm* — Katten Muchin Rosenman LLP

(57) ABSTRACT

Apparatus and method converting feedstock (e.g., chicken litter) into oil, gas, and ash fertilizer has a reformer unit with (i) a feedstock input, (ii) an outer wall, (iii) a reaction chamber with an inner wall, (iv) a combustion gas input, (v) a scrubbing liquid input, (vi) a feedstock stirrer, (vii) an ash stirrer, (viii) an ash plate below the reaction chamber, and (ix) a combined liquid/gas output. The ash plate is separated from the inner wall. Feedstock and scrubbing liquid are preferably reacted within the reaction chamber to release useful hydrocarbon liquids and gasses which migrate to the top of the reformer, while ash from the reaction falls onto the ash plate from where it is output. Liquid/gas pump structure sends the combined liquid/gas from the reformer to gas/liquid separator structure which provides a gas output and a liquid output. The gas output may be used, flamed off, and/or recirculated to the reaction chamber. Oil/water separator structure receives the liquid output and provides a (e.g., scrubbing) water output and an oil output. Processor structure controls the various motors, valves, etc., to control the inputs/outputs and the temperature of the reformer so as to cause an electric current to flow upward along the inner wall and inward toward the reaction product within the reaction chamber to cause arcing in the feedstock; which arcing disassociates molecules into atoms, thus releasing more energy. The oil is refinable, the gas is high in energy content, and the ash fertilizer is high in nitrogen.

29 Claims, 6 Drawing Sheets

(51) Int. Cl.
*C10B 49/04* (2006.01)
*C10B 53/00* (2006.01)
*C10G 1/00* (2006.01)
*C01B 3/02* (2006.01)
*C05F 3/06* (2006.01)

(56) References Cited

U.S. PATENT DOCUMENTS

| | | | |
|---|---|---|---|
| 4,497,970 | A | 2/1985 | Young |
| 4,583,992 | A | 4/1986 | Rogers |
| 6,130,260 | A | 10/2000 | Hall et al. |
| 6,238,543 | B1 | 5/2001 | Law, Jr. et al. |
| 7,301,060 | B2 | 11/2007 | Appel et al. |
| 7,387,712 | B2 | 6/2008 | Purta et al. |
| 7,438,987 | B2 | 10/2008 | Cooper et al. |
| 7,473,285 | B2 | 1/2009 | Russell et al. |
| 7,964,026 | B2 | 6/2011 | Rogers |
| 7,981,563 | B2 | 7/2011 | Ong et al. |
| 8,216,345 | B2 | 7/2012 | Rogers et al. |
| 8,425,633 | B2 | 4/2013 | Banasiak et al. |
| 8,529,646 | B2 | 9/2013 | Eskin et al. |
| 8,550,018 | B2 | 10/2013 | Lin |
| 8,652,696 | B2 | 2/2014 | Sirdeshpande |
| 8,669,013 | B2 | 3/2014 | Powell et al. |
| 2005/0268556 | A1 | 12/2005 | Rogers |
| 2006/0249021 | A1* | 11/2006 | Rogers .................. 95/187 |
| 2007/0251436 | A1 | 11/2007 | Beausoleil et al. |
| 2009/0031616 | A1 | 2/2009 | Agblevor |
| 2009/0062581 | A1 | 3/2009 | Appel et al. |
| 2012/0197050 | A1 | 8/2012 | Joshi et al. |
| 2013/0185999 | A1 | 7/2013 | Chen et al. |
| 2014/0011104 | A1* | 1/2014 | Gur et al. ............. 429/410 |
| 2014/0332724 | A1* | 11/2014 | Tsangaris et al. ......... 252/373 |

OTHER PUBLICATIONS

G. Akcay et al., "Dynamic pyroelectric enhancement of homogeneous ferroelectric materials", Solid State Communications 137, Feb. 2, 2006, pp. 589-594.

M. Vangas et al., "Water Electrolysis With DC Pulses and Plasma Discharge", International Scientific Journal for Alternative Energy and Ecology (ISJEE), No. 09 (113), Accepted Aug. 30, 2012.

I. Fells, "Ionization Processes in Gases and Their Application to Energy Conversion Systems", Pure Appl. Chem., vol. 5, Nos. 3-4, 1962, pp. 513-528 (XVIIIth International Congress of Pure and Applied Chemistry, Montreal, Canada, Aug. 6-12, 1961).

C.G.M. Van Kessel and J.W.M.A. Houben, "Loss Mechanisms in an MHD Generator", Eindhoven University of Technology, The Netherlands, Department of Electrical Engineering, Group Direct Energy Conversion, Jun. 1972.

Alan Snelson, "The Reaction of Atomic Hydrogen With Carbon" Chapter 5 of Coal Gasification vol. 131, Lester G. Massey, editor, published by the American Chemical Society, Jun. 1, 1974.

J. Xie, P. P. Mane, C. W. Green, K. M. Mossi, "Energy Harvesting by Pyroelectric Effect Using PZT", Proceedings of SMASIS08, ASME Conference on Smart Materials, Adaptive Structures and Intelligent Systems, Oct. 28-30, 2008, Ellicott City, Maryland, USA.

SaberMohammadi and Akram Khodayari, "Pyroelectric Energy Harvesting: With Thermodynamic-Based Cycles", Hindawi Publishing Corporation, Smart Materials Research, vol. 2012, accepted Feb. 2, 2012.

Karen Pukalo, "Predicting the Vortex Viscosity of a Ferrofluid", Jun. 8, 2007, available online at <http://courses.washington.edu/microflo/karen.pdf>.

* cited by examiner

APPARATUS AND METHOD FOR CONVERSION OF SOLID WASTE INTO SYNTHETIC OIL, GAS, AND FERTILIZER

This application claims priority to U.S. Provisional Patent Appln. No. 61/986,997, filed May 1, 2014, the entire contents of which are incorporated herein by reference.

BACKGROUND OF THE INVENTION

1. Field of the Invention

The present invention relates to systems, apparatus, and methods, whereby carbon-based wastes may be converted into (i) high-grade synthetic crude oil, (ii) synthetic gas (Syn-Gas), and (iii) nitrogen-rich ash fertilizer, and to compositions made thereby. In a particularly preferred embodiment, the invention relates to the conversion of animal wastes, such as chicken litter, into the above-noted products in a process that is eco-friendly, can use feedstock with up to 75% water content, produces essentially no harmful fugitive emissions, operates at low pressure and at skin temperatures below 140 degrees Fahrenheit (no risk of explosion), requires no heating, cooling, or drying of feedstock, and the reaction is self-sustaining after initial ignition.

2. Description of Related Art

As is known, chicken is a very popular meal in American homes and restaurants. Increasing sales of chicken products have led to the wide-spread industrial production and processing of chicken stock. In 2013, it was estimated that there were more than one billion chickens in each of Georgia, Arkansas, and Alabama; with Mississippi, North Carolina, Texas, and Kentucky not far behind. Of course, such vast numbers of chickens mean vast amounts of solid waste, termed "chicken litter", from the bedding material and from the chickens themselves. It is estimated that one billion chickens will produce 5500 tons of chicken litter per day. This is a prodigious amount of solid/liquid waste which is currently causing severe environmental problems, such as water-table pollution, methane-gas production, pollution of streams and rivers, etc. The U.S. Environmental Protection Agency has taken steps to ameliorate the disadvantageous environmental effects of chicken litter. See, for example, EPA Notice EPA 305-F-03-002, April 2003, "Poultry Production and Environmental Stewardship."

Some attempts have been made to covert waste, such as chicken litter, into usable energy. As one example, the inventor of the subject application is an inventor of U.S. Pat. No. 7,964,026, issued Jun. 21, 2011, and U.S. Pat. No. 8,216,345, issued Jul. 10, 2012 (the entire contends of each being incorporated herein by reference), which disclose gasification method and apparatus for converting chicken litter into a combustible gas. This was a notable advance in the art, but produced only gas, while filtering out oil, tar, and other "waste" materials. Thus, much potential energy was lost. Furthermore, it is known that combustible gas presents collection and distribution problems, especially in a production model where many such facilities are distributed over wide areas of agricultural land. Considering their relative potential energy, oil is easier to transport than gas.

Now, consider all forms of waste. Waste in all forms is an inevitable product and dilemma of modern urban and rural life. Animal waste poses a serious threat to the World's watersheds and serious health risks. Animal waste—chickens, hogs or cattle—is one of the world's greatest threats to natural habitats, water tables, and the health of the environment. It has been estimated that there are approximately 17 billion chickens, 1 billion cattle, and 1 billion pigs worldwide that produce 13 billion tons of waste each day that must be disposed of. The growth of industrial farming has concentrated thousands of animals on increasingly fewer farms resulting in enormous amounts of animal waste on relatively small plots of land increasing the risk of run-off and watershed damage. Raw animal waste is commonly used as a fertilizer with a drying or curing process that releases methane gas into the atmosphere. Factory farms crowd animals into relatively small areas where waste accumulates in massive waste piles or fetid lagoons that can threaten the health of livestock as well as leak or overflow, sending dangerous bacteria, phosphorous, and nitrate pollution into water supplies. Animal waste emits methane that has 25 times the Global Warming Potential (GWP) of carbon dioxide However, the known art described in the above-noted patents still fails to achieve many desired traits. With respect to farm-produced syngas, typical farms could not consume the energy that could be produced thereby, and could not benefit economically from the sale of electricity, primarily from the capital cost of the infrastructure. Essentially, from environmental and economic standpoints, the solutions did not provide for a net gain to the poultry farm.

SUMMARY OF THE INVENTION

The present invention differentiates from the prior art through, inter alia, the generation of an electric current within the reaction chamber by means of a fuel cell-type action. Because of the separation of the ash plate from the inner wall section, the addition of cross members to the inner wall section, and the separate control of the (preferably) three (3) stirring or agitating members, the reaction chamber can be controlled to produce electric current to enhance the chemical reactions. The ability to control where the carbonate layer is disposed within the reaction chamber, with respect to the fuel stirring device(s), allows current to be produced and flow from the chamber inner wall to the stirring shaft through the wetted feedstock between the cross members and the multiple stirring arms, making them act as electrodes. The prior art '026 Patent could not accomplish this, and the feed stocks were thus subject to combustion reactions only. In the '026 Patent, the fuel stirrer needed to move more frequently and would remove ash as it moved, not allowing time for the formation of a beneficial carbonate electrolyte layer. The ash layer height can be controlled independently in the present invention, and with the physical detachment of the ash plate from the inner wall, the present invention functions as a fuel cell in the lower portion of the inner wall section of the reaction chamber. This generates the electricity needed for much more fruitful chemical reactions to be described below.

The present invention also has secondary applications beyond chicken litter. For example, feedstock for the present invention can come from any organic source to include, at least: poultry litter, horse manure, cow manure, shredded tires (with metal), wood waste, switch grass, cafeteria waste, rice hulls, MDF sanding dust (with water added), lignite, gasifier ash and municipal solid waste. Such feedstocks can contain up to 75 percent by weight of water, thus making available a very wide array of materials for use in the present invention.

It is an advantage of the present invention to overcome the problems of the related art and to provide a means to convert what would be waste water and hazardous organic acids produced by prior art gasifiers and other biomass pyrolysis processes into the potential energy of hydrocarbon liquids. This provides the means to convert all of the manure and organic waste into an economically viable means of waste removal. The present invention also produces gas, which can be used for, e.g., electricity-generation and/or the production of marketable hydrocarbons, while the remaining matter is converted into sellable crude oil and nitrogen-containing ash fertilizer.

According to a first aspect of the present invention, a novel combination of structure and/or steps is provided whereby apparatus converting chicken liter into oil, combustible gas, and ash fertilizer has a feed stock input configured to receive the chicken liter. A reformer is coupled to the feed stock input and is configured to provide oil, combustible gas, and ash fertilizer outputs. Preferably, the reformer has (i) an outer wall, (ii) a reaction chamber with an inner wall unconnected to the outer wall at an upper portion of the reaction chamber, (iii) a combustible gas input, (iv) a scrubbing liquid input, (v) a fuel stirrer, (vi) an ash stirrer, (vii) an ash plate, (viii) an igniter, and (ix) a combined liquid/gas output. The ash plate is electrically isolated from the inner wall. An ash output is configured to output ash from a bottom of the reformer. At least one liquid/gas pump is preferably configured to carry the combined liquid/gas from the reformer liquid/gas output. At least one gas/liquid separator is preferably configured to receive the liquid/gas output from the at least one liquid/gas pump, and provide a substantially gas output and a substantially liquid output. At least one oil/water separator is preferably configured to receive the substantially liquid output from the at least one gas/liquid separator and to provide a substantially water output and a substantially oil output. At least one processor is configured to control at least the feed stock input, a temperature of the reformer, the at least one liquid/gas pump, the at least one gas/liquid separator, and the at least one oil/water separator. The at least one processor controls the temperature of the reformer so as to cause an electric current to flow upward along the inner wall and inward toward heated reaction products within the reaction chamber.

According to a second aspect of the present invention, a novel combination of structure and/or steps is provided whereby a fuel cell-like structure is formed from the operation and configuration of the ash plate and the inner wall of the reaction chamber. This causes current flow through the ash layer, under the carbonate electrolyte layer, and arcs due to the size and crystalline structure of the ash. This arcing causes dissociation of incoming molecules, such as nitrogen, hydrogen, etc., into their atomic species. For example, hydrogen is naturally $H_2$, a molecule, and by contact with the induced electric arc become 2H, an atom. Atoms can have at least a 10 fold increase in the reaction energies over the naturally occurring molecule; this is seen in the potential energy of output products. Just above the fuel cell layer is a charcoal produced by the heat generated by the less than 100% efficiency of the fuel cell to cause pyrolysis of the feedstock. The pyrolysis oils and water then rise back up through the section of fuel stirrer arms and inner wall cross members (being electrodes) for the electrolysis of the pyrolysis oil, water, and injected sludge and water from the oil/water separator, to produce gas, including ammonia, and hydrocarbon liquids.

According to a third aspect of the present invention, a novel combination of features is provided whereby non-transitory computer-readable media is used with at least one processor to control the pumps, valves, and motors for the flow of gases, liquids, ash, and feedstock into and out of the system; to control the frequency and speed of the feedstock leveler and feed auger to maintain proper levels in the system; to control of the fuel stirrer(s) to maintain the consistency of the feedstock and maximize surface exposure for continuous electrolysis of the water and pyrolysis oils; to control the ash stirrer(s) to maintain the carbonate electrolyte layer for the generation of electricity for the other processes; to control the injection of sludge and water onto the feedstock to control the temperature and maintain the layers appropriately for the processes to occur; and to control the quality of the outputs. The at least one processor also controls the valves for the ash output which, in turn, control the amount of air input to the system through the ash auger. There are eight or more devices that are preferably controlled to manage the layers that induce the processes which produce the products.

BRIEF DESCRIPTION OF THE DRAWINGS

Exemplary embodiments of the presently preferred features of the invention will now be described with reference to the accompanying drawings.

DETAILED DESCRIPTION OF THE PRESENTLY PREFERRED EXEMPLARY EMBODIMENTS

1. Introduction

Figure 1A:
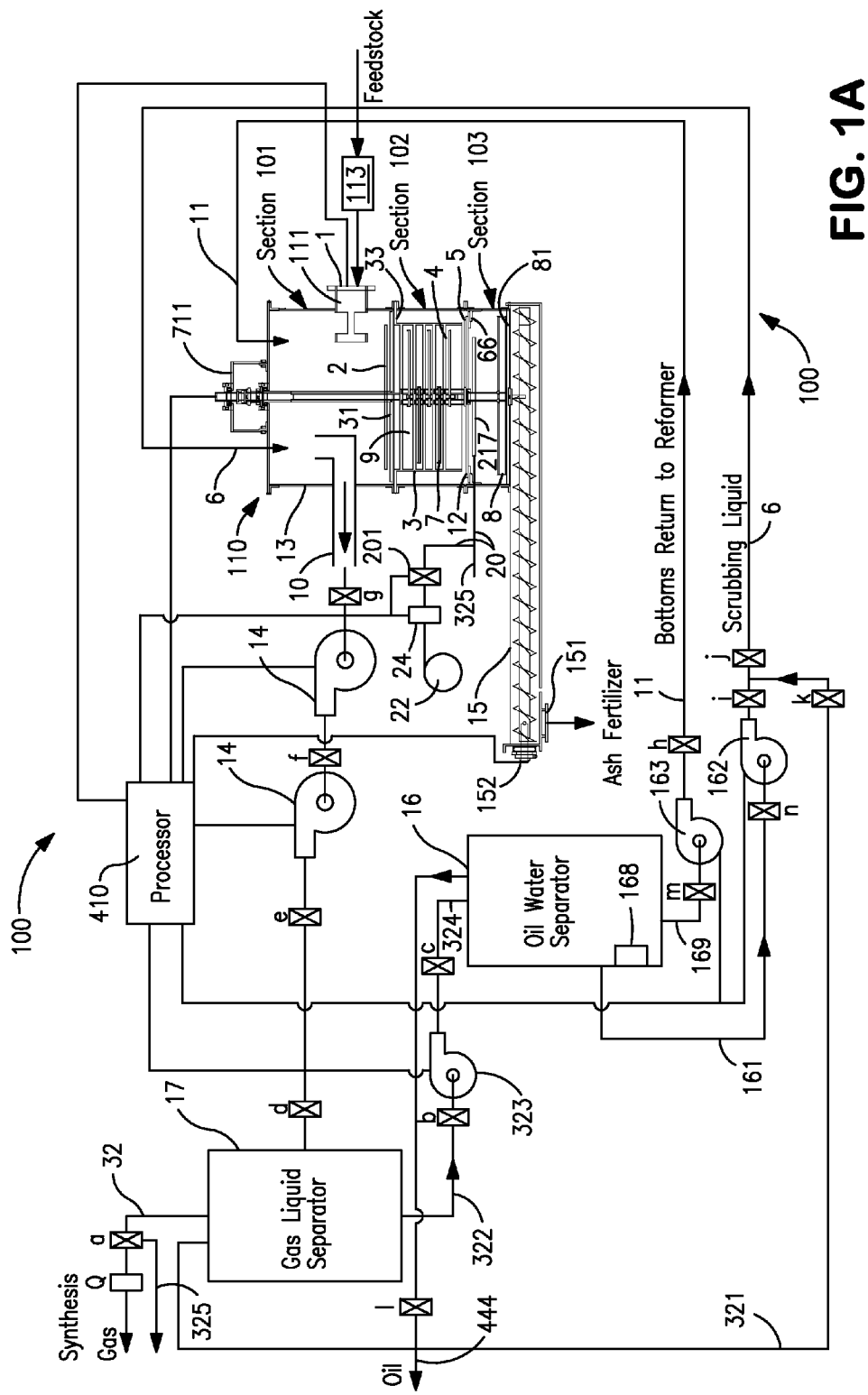
FIG. 1A is a block diagram of certain of the apparatus according to a preferred embodiment of the present invention.

The present invention will now be described with respect to several embodiments in which organic feedstock, such as chicken litter, is converted into refinable oil, combustible gas, and ash fertilizer, using a very small carbon footprint process and apparatus.

Briefly, the preferred embodiments of the present invention provide apparatus, process, computer-implemented method, and non-transitory computer-readable code whereby feedstock, such as chicken litter, is converted into oil, gas, and fertilizer, solving environmental and energy problems at once.

Unless otherwise indicated, all numbers expressing dimensions, capacities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

The present invention may be practiced by implementing process steps in different orders than as specifically set forth herein. All references to a "step" may include multiple steps (or substeps) within the meaning of a step. Likewise, all references to "steps" in plural form may also be construed as a single process step or various combinations of steps. The present invention may be practiced by implementing process units in different orders than as specifically set forth herein. All references to a "unit" may include multiple units (or subunits) within the meaning of a unit. Likewise, all references to "units" in plural form may also be construed as a single process unit or various combinations of units.

As used in this specification and the appended claims, the singular forms "a," "an," and "the" include plural referents unless the context clearly indicates otherwise.

Unless defined otherwise, all technical and scientific terms used herein have the same meaning as is commonly understood by one of ordinary skill in the art to which this invention belongs. If a definition set forth in this section is contrary to or otherwise inconsistent with a definition set forth in patents, published patent applications, and other publications that are herein incorporated by reference, the definition set forth in this section prevails over the definition that is incorporated herein by reference.

The term "processor" and "processing structure" as used herein means processing devices, apparatus, programs, circuits, components, systems, and subsystems, whether implemented in hardware, tangibly-embodied software or both, and whether or not programmable. The term "processor" as used herein includes, but is not limited to, one or more computers, personal computers, CPUs, ASICS, PLC's, hardwired circuits, signal modifying devices and systems, devices, and machines for controlling systems, central processing units, programmable devices, and systems, field-programmable gate arrays, application-specific integrated circuits, systems on a chip, systems comprised of discrete elements and/or circuits, state machines, virtual machines, data processors, processing facilities, and combinations of any of the foregoing.

The terms "storage" and "data storage" and "memory" as used herein mean one or more non-transitory data storage devices, apparatus, programs, circuits, components, systems, subsystems, locations, and storage media serving to retain data, whether on a temporary or permanent basis, and to provide such retained data. The terms "storage" and "data storage" as used herein include, but are not limited to, hard disks, solid state drives, flash memory, DRAM, RAM, ROM, tape cartridges, and any other medium capable of storing computer-readable data.

The term "feedstock" shall mean any type of organic material capable of being reduced by the present process to include, but not limited to, materials such as poultry litter, horse manure, cow manure, any type of animal waste, shredded tires (with metal), wood waste, switch grass, cafeteria waste, rice hulls, bagasse MDF sanding dust (with water added), lignite, gasifier ash, and municipal solid waste.

"Biomass," for the purposes of the present invention, is any material not derived from fossil resources and comprising at least carbon, hydrogen, and oxygen. Biomass includes, for example, plant and plant-derived material, vegetation, agricultural waste, forestry waste, wood waste, paper waste, animal-derived waste, and poultry-derived waste. The present invention may also be used for carbon-containing feedstocks other than biomass, such as a fossil fuel (e.g., coal, petroleum, oil, and tar sands) and municipal solid waste. Thus, any method, apparatus, or system described herein in reference to biomass can alternatively be used with any other feedstock. Also, various mixtures may be utilized, such as mixtures of biomass and coal.

The methods and systems of the invention can accommodate a wide range of feedstocks of various types, sizes, and moisture contents. In some approaches of the invention, the biomass feedstock can include one or more materials selected from timber harvesting residues, softwood chips, hardwood chips, tree branches, tree stumps, leaves, bark, sawdust, off-spec paper pulp, corn, corn stover, wheat straw, rice straw, soybean straw, sugarcane bagasse, switch grass, miscanthus, commercial waste, grape pumice, almond shells, pecan shells, coconut shells, coffee grounds, grass pellets, hay pellets, wood pellets, cardboard, paper, algae, or the torrified version of any biomass materials listed above. Industrial byproducts such as corn fiber from a wet-mill ethanol process or lignin from a cellulosic ethanol plant can also be feed stocks. A person of ordinary skill in the art will readily appreciate that the carbon based feedstock options are virtually unlimited. For example, the present invention can process feed stocks with moisture contents of 25 percent, 30 percent, 35 percent, 40 percent, 45 percent, 50 percent, 55 percent, 60 percent, 65 percent, 70 percent, or even higher.

2. The Structure of the Preferred Embodiments

Figure 1B:
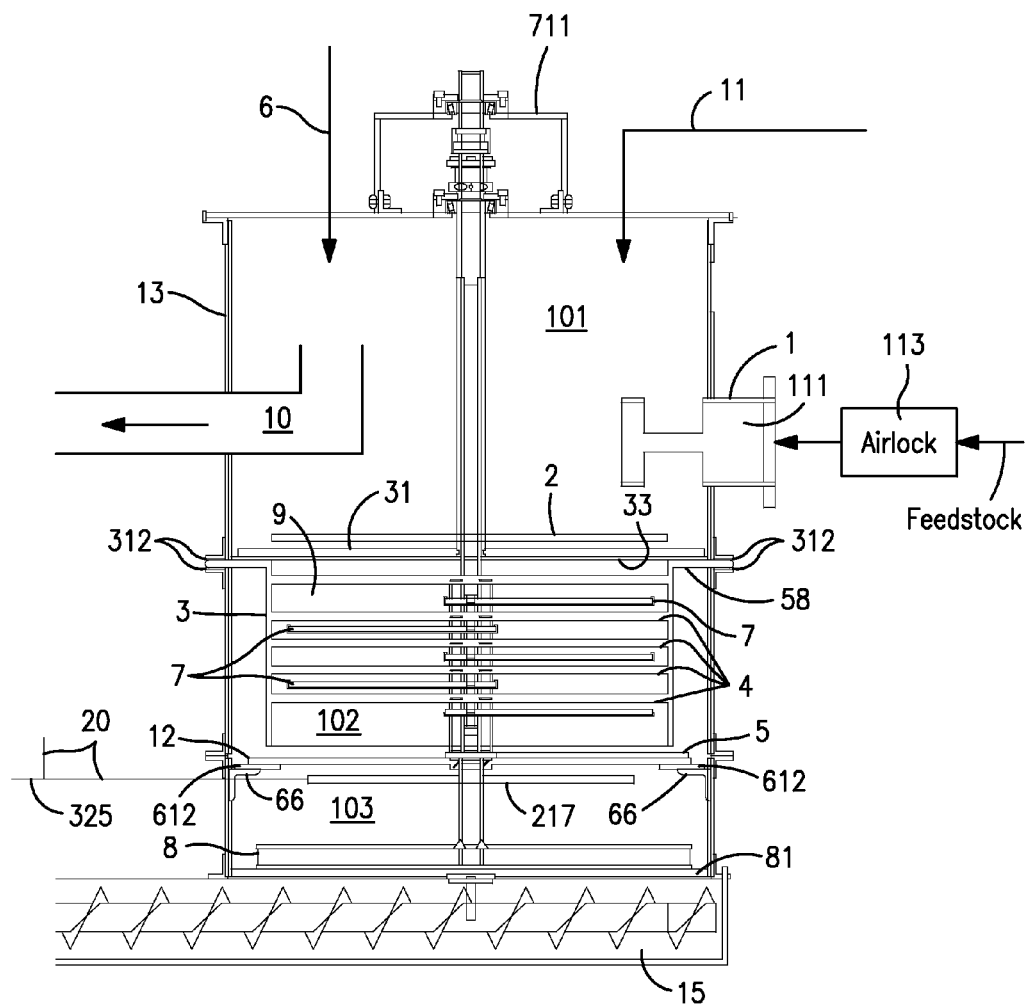
FIG. 1B is a close-up of the reformer of FIG. 1A.

With reference to FIGS. 1A and 1B, the reformer apparatus 100 includes a reformer chamber 110 having a top section 101, a middle section 102, and a lower section 103. Generally, (i) feedstock is introduced into the top of section 102 through, e.g., a feed stock auger 1, (ii) the feedstock is reaction-processed in the section 102 in a manner to be described in greater detail below, (iii) certain gravity-fed reaction byproducts, such as ash fertilizer, are evacuated through the section 103 via, e.g., an ash auger 15, and (iv) certain liquid-entrained reaction byproducts are extracted though pipe 10 for production of syngas and oils. Note that the current reformer is scalable and may be produced in embodiments/units of two ton per day, ten ton per day, fifty ton per day, one hundred ton per day, etc.

The reformer chamber 110 has an outer wall 13 that is preferably made of 304 stainless steel or better, and is preferably approximately 4 feet in diameter, ¼" inches thick walls, and 7½ feet tall. The reformer section 101 preferably intakes scrubbing liquid via a line/pipe 6; and recirculated waters, oils, and sludge through a line/pipe 11, in processes to be described further below. The input feedstock and liquids in the section 101 are preferably gravity-fed to an upper plate 31, which is preferably supported by a donut shaped plate 33 (which may be made of an electrically and/or thermally insulating material) coupled to an outer cylindrical wall 13. The upper plate 31 is preferably perforated (in a manner generally similar to the ash plate 12 depicted in FIG. 3; although the holes may be larger to act as a filter and a former for the input feedstock. For example, the upper plate 31 may have approximately 100 holes, each approximately three-quarters of an inch in diameter. In a particularly preferred embodiment, the flanges on the sections 101 and 102 (FIG. 1B) support the upper plate 31, and are separated by silicon gaskets 312 to effect the desired insulation. The upper plate 31 and the donut shaped plate 33 hold and combine the feedstock and liquids so that they are properly formed and filtered before they fall into the inner reaction chamber 9 of the section 102, helped by at least one rotating leveling arm 2, preferably disposed above the upper plate 31 (but at least one such leveling arm 2 could be disposed below the plate 31). For some feedstocks which are more homogeneous in size (such as some types of chicken litter), the upper plate 31 is not necessary, and the donut shaped plate 33 and the leveling arm 2 can provide acceptable dispersal of the feedstock into the reaction chamber. In this configuration, input liquid from line 11 would be mixed with the feedstock on the donut shaped plate 33.

The reformer 110 has an inner cylindrical wall 3, which forms a reaction chamber 9 in conjunction with the upper plate 31 at the top, and an ash plate 12 at the bottom thereof. Preferably, the inner wall 3 is made of a 310 or better stainless steel, is 3.6 feet in diameter, 0.5 inch thick, and 1.5 feet tall. Preferably, the ash plate 12 is supported by another donut-shaped plate 66 (which may be segmented in sections and which may be supported an electrical and/or thermal insulator, such as a silicon gasket 612—also segmented). The ash plate 12 (FIG. 3) can be of the same design as the upper plate 31, or a different design, depending on the particular type of feedstock being used. In the most preferred embodiment, for chicken litter, the ash plate 12 has approximately 200 holes, each approximately one half inch in diameter. The ash plate 12 is preferably supported by the donut-shaped plate 66 or by brackets within the outer wall, and preferably is separated from the inner wall 3, so that ash can spill over its entire circumference, through the segments in plate 66 and gasket 612.

Within the reaction chamber 9 are disposed plural cross members 4 (see FIGS. 2A and 2B), which act to break up any feedstock, ash, and/or partially-combusted products, to provide complete reaction pyrolysis, and to produce a fine ash. Cross members 4 are preferably attached across the inner wall 3 above and below each arm of the fuel stirrer arms 7, making sure there is no contact with the fuel stirrer arms 7. Preferably, the cross members 4 are welded to the outside and to the inside of the inner wall 3 where they pass therethrough, to prevent gas leakage. These cross members 4 are preferably made of chrome alloy steel and preferably are chrome-plated. Additionally, the cross members 4 are preferably staggered around the circumference so no two members are in alignment. See FIGS. 2A and 2B.

Also within the reaction chamber 9, and interlaced with the cross members 4 (see FIG. 1B), are (i) at least one (for chicken litter, preferably five) one-arm, rotating fuel stirrer arms 7, and (ii) at least one one-arm, rotating ash stirrer arm 5. These stirrers also act to keep the feedstock and pyrolysis reaction products agitated for better surface contact ignition and more efficient production of the oil, gas, and ash. Preferably, the multiple fuel stirrer arms 7 are evenly staggered about their axis of rotation, when viewed from above. Of course, the leveling arm 2, the fuel arms 7, and the ash arm 5 may each comprise one or more arms, which may rotate, vibrate, and/or reciprocate, as desired. While these arms may be driven by a common motor, in the preferred embodiment each is driven by its own separate motor and may be driven to move in multiple directions.

Figure 3:
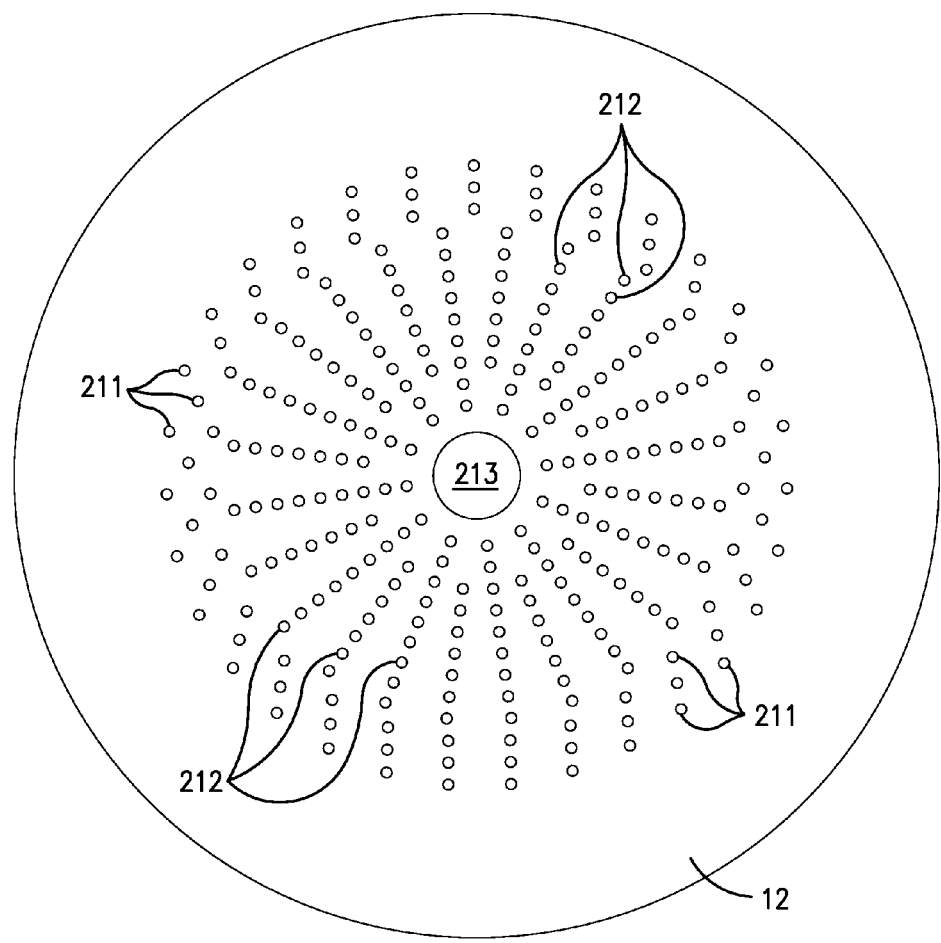
FIG. 3 is a top plan view of the ash plate 12 of the FIG. 1 embodiment.

The reformer (inner) reaction chamber 9 also has a gas input line 20, which may come from a propane tank 22, and/or be coupled to a synthetic gas line 325. An igniter 24 (e.g., a spark plug) is preferably coupled to the gas input line 20, and acts to ignite propane in the gas input line 20, which is fed to a burner 217 (preferably disposed beneath the lower ash plate 12) to begin the combustion process to initiate the reactions within the chamber. The burner 217 may comprise a simple two-arm burner with twenty-four gas holes in each arm, or a circular burner with a similar number of holes. Preferably, the ignited gas is distributed upward into the reaction chamber through holes 212 in the lower ash plate 12 (FIG. 3). After combustion has reached a predetermined target (or threshold), such as 150 degrees F. (as detected by a thermostat inside the reaction chamber 9 coupled to one or more control processors 410), the input gas line 20 is then fed with the recirculated synthetic gas produced by the reaction/reformation process to be described below, via line 325; and propane from the tank 22 is turned off, for example with valve 201. The ash produced by the process to be described below falls through the reaction chamber 9, is agitated by the ash stirrer 5, and then falls over the circumference of the ash plate 12 (and/or through holes/slots therein), through to a bottom ash plate 8, which is preferably the bottom of the lower section 103 where the ash auger 15 is preferably mounted. The ash is then swept into the ash auger 15 with at least one lower ash stirrer 81 (FIG. 1B) which may be disposed above or below the bottom ash plate 8; and the ash is then exhausted through an ash output 151 into, preferably, a barrel or other receptacle. The at least one lower ash stirrer 81 preferably has four stirring arms, and the bottom ash plate 8 is preferably at least equal in diameter to the outer wall 13. The bottom ash plate 8 preferably is circular-shaped and has a generally rectangular shaped slot therein disposed over the top of ash auger 15. The top and bottom edges of the rectangular slot are preferably curved with a similar diameter as the outside of the ash plate 8, to enhance movement of the ash into the ash auger 15.

The other usable (combustible) products are preferably extracted from the reformer 110 as a gas/liquid mixture via exit piping 10 from the top section 101, after being mixed with scrubbing water introduced via the scrubbing water input line 6. Preferably, the scrubbing line 6 is disposed directly above the intake of the output line 10. Preferably, two gas/liquid blowers or pumps 14 take the liquid/gas output from the output piping 10 and provide it to the gas/liquid separator 17. Preferably, each blower comprises a 25 GPM, 800 CFM @ 50 ft. of head gas/liquid pump. These blowers thus form a vacuum or low pressure volume inside the top section 101 of the reformer 110, which aids in the formation of beneficial hydrocarbon gasses/liquids, as will be described in greater detail below.

The gas/liquid separator 17 then separates the gas products from the liquid products, and provides some of the liquid via line 321 to the scrubbing liquid line 6, for reintroduction into the top section 101 of the reformer 110. Gas products from the gas/liquid separator 17 are preferably output via the synthetic gas line 32, which gas may be (i) re-used via the gas input line 325, and/or (ii) be used as an energy source for other processes such as electricity generation, heating, conversions to liquid carbons (Gas To Liquids), etc., and/or (iii) merely flamed as waste. Liquid from the bottom of the gas/liquid separator 17 is extracted via a liquid line 322, preferably boosted by a pump 323, and provided to the oil/water separator 16 via line 324.

The oil/water separator 16 separates the oil from the water and provides the refinable oil through oil output line 444. Water is preferably output from the side of the oil/water separator 16 via line 161 (which may have a floating output valve) to a scrubbing liquid pump 162 for transmission to the scrubbing liquid line 6. Heavier separated oils, tars, sludge, etc., are preferably taken from the bottom of the oil/water separator 16 via line 169 via pump 163, and sent back to the reformer 110 via line 11.

Control of the process is preferably achieved by at least one processor 410 connected to the various components via wires (some of which are shown in FIG. 1A) and/or wireless means. The at least one processor may comprise a personal computer, one or more special purpose processors, hardware, and/or firmware, etc. The at least one processor 410 preferably contains program code which, when loaded into and run by the at least one processor, causes the at least one processor to execute the functions described herein and those typical functions necessary or convenient to support the described functions. The at least one processor 410 preferably controls the entire process by controlling the various motors, pumps, augers, valves, etc. to be described below.

The feedstock auger 1 introduces feedstock into the reformer at a rate controlled by a feedstock auger motor 111, as controlled by the at least one processor 410. The one or more fuel stirrers 7, the one or more ash stirrers 5, and one or more leveling arms 2 are controlled by a common motor (or individual motors) 711, as controlled by the at least one processor 410. The igniter 24 and an input gas line valve 201 are also controlled by the at least one processor 410, as is the ash auger 15 via ash auger motor 152. The rate at which the gas/liquid reaction products are removed from the reformer is controlled, inter alia, by the speed and torque of the respective motors of blowers 14. Likewise, the operations of the pumps 162, 163, and 323 are also controlled by the at least one processor 410. Further, each of lines/pipes depicted and described herein may have one or more valves a, b, c, d, e, f, g, h, i, j, k, l, m and n to control flow in their respective lines, as either on/off, multiple outputs, and/or restricted flow, depending on the needs of the process, as controlled by the at least one processor 410. The connections from the at least one processor to the above-noted valves are not depicted in FIG. 1A for clarity, although those connections may be wired or wireless, depending on the installation. As one example only, process parameters which have been successfully tested with the preferred embodiment include: control of the syngas out of system to control the flow of synthesis gas back to the reformer through the flow control valve a, preferably controlled by one or more oxygen sensors Q in the syngas output line 32. The scrubbing liquid 6 and bottoms return 11 are preferably controlled by variable speed motors in pumps 162 and 163, preferably controlled by one or more emulsion level control devices 168 in the oil/water separator 16.

Figure 2A:
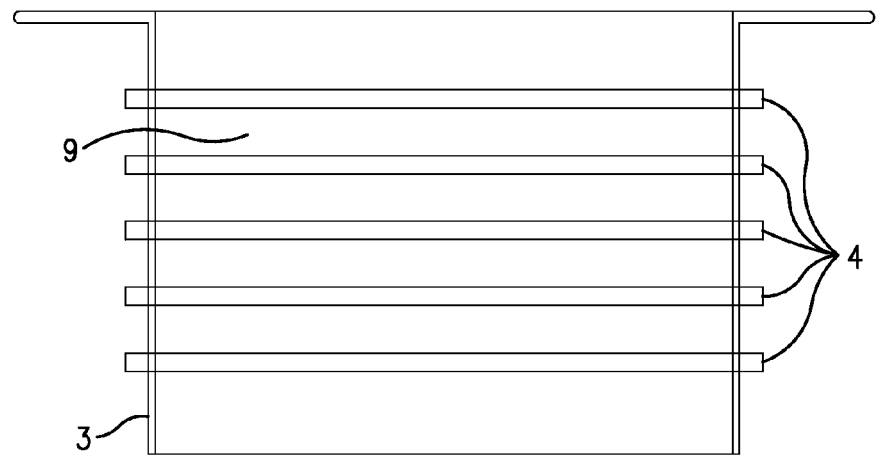
FIGS. 2A and 2B are, respectively, cross-sectional and top plan views of the reaction chamber cross members 4 according to the FIG. 1 embodiment.
Figure 2B:
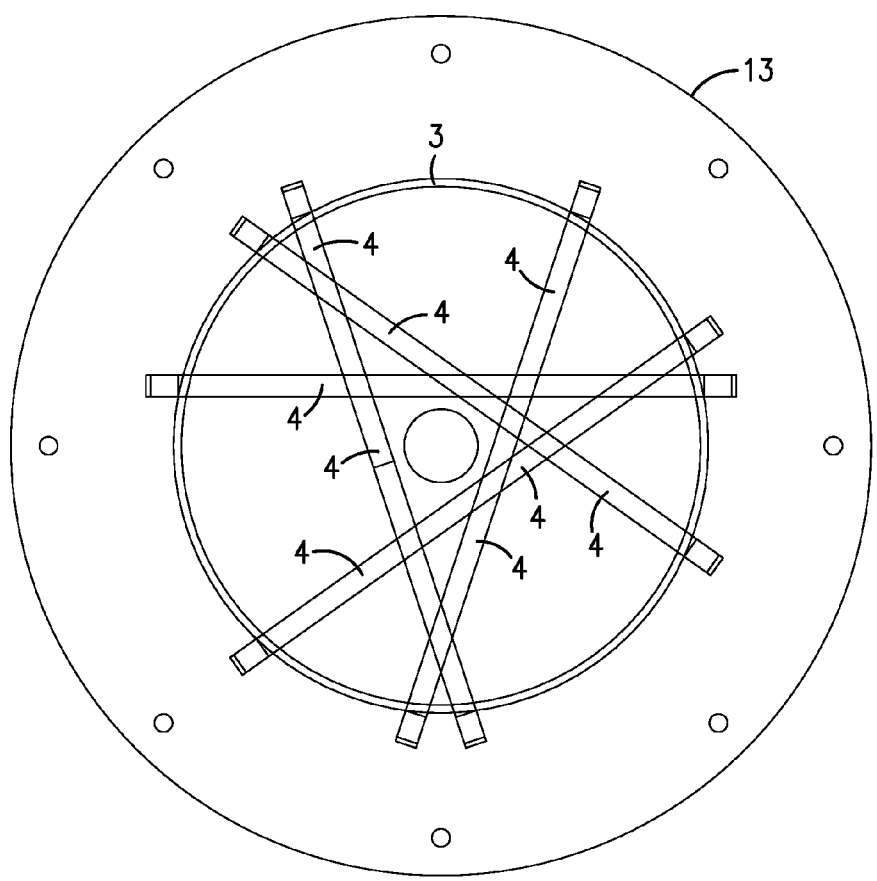

FIGS. 2A and 2B depict a preferred structure of cross members 4 disposed in the reaction chamber 9. FIG. 2A is a plan view of the cross members 4, which are, preferably, interspersed with respect to the one or more fuel stirrers 7 and the one or more ash stirrers 5. FIG. 2B is a top view of the cross members 4, showing the preferred crossing patterns designed to break up and homogenize the various layers of pyrolysis reaction products within the reaction chamber 9. Preferably, each cross member 4 is made of 4140 chrome plated steel or better, and is 3.6 feet long, 1 inch wide, and 1 inch thick.

FIG. 3 is a top plan view of the ash plate 12, showing an outer pattern of through-holes 211, and a different inner pattern of through-holes 212. A central hole 213 allows for passage of the support shaft of the fuel and ash stirrers. Preferably, the ash plate 12 is made of 304 stainless steel or better, is 448 inches in diameter, and is ⅝ inches thick. The bottom ash plate 8 may be of a similar design, or different design, as deemed appropriate for each application. As noted above, the bottom ash plate 8 preferably has a 12 inch by 3 inch opening on one side of the central hole 213, above where the ash auger 15 is mounted. The ash stirrer 8 sweeps ash that has fallen by gravity into ash auger 15.

3. The Functions of the Preferred Embodiments

Figure 4:
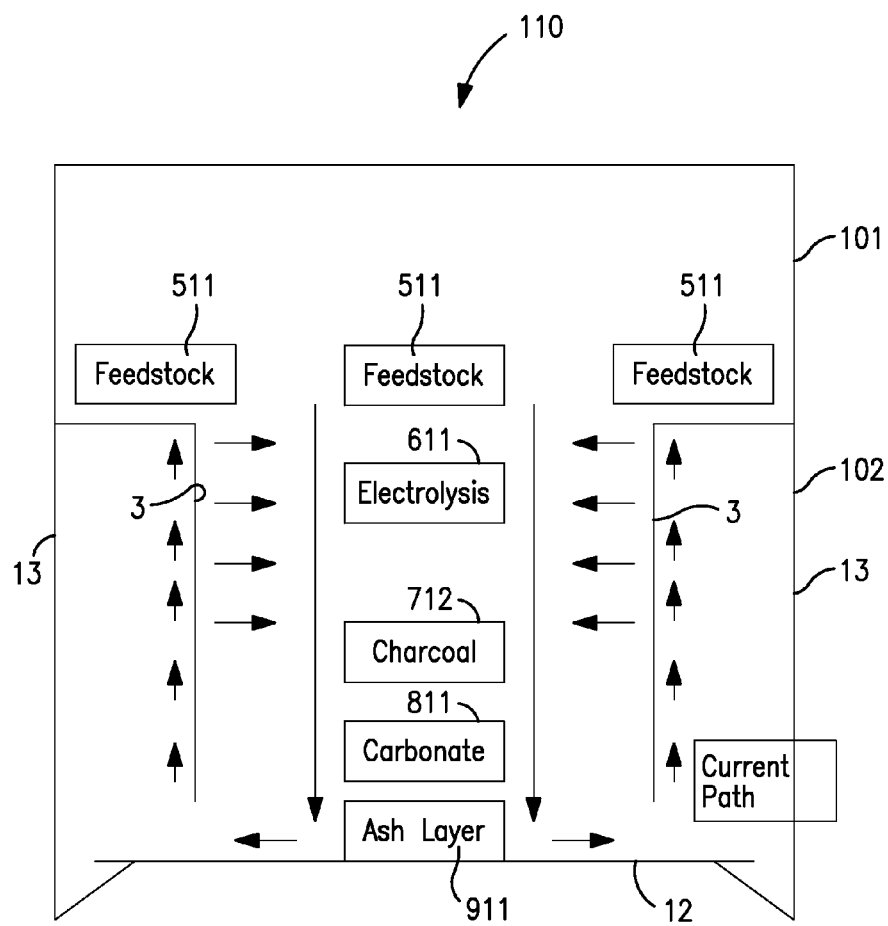
FIG. 4 is a schematic diagram of some of the processes and layers within the reaction chamber of the FIG. 1 embodiment.

FIG. 4 is a schematic functional block diagram of the various layers and processes which take place inside the reaction chamber 9 of the reformer 110. These layers are preferably formed as a single stack of layers which may or may not have clearly defined boundaries between the layers. As described above, feedstock 511 (wetted to perhaps 50 percent with recirculated sludge, and/or scrubber liquid, and/or its own compounds) is preferably introduced into reformer section 101 at ambient temperature or the temperature of the oil/water separator 16 (e.g., 125-130 degrees F.). The feedstock 511 is preferably combusted/processed in the electrolysis layer 611 (to cause pyrolysis), in the charcoal layer 712, in the carbonate plasma layer 811, and in the ash layer 911, in a manner to be described below. In each layer, solid mineral carbons migrate downward due to the force of gravity, as assisted by the stirrers, to the ash plate 12 where they will exit the reaction chamber 9 as ash. At the same time, useful oils and gasses migrate upward through the layers to the reformer upper section 101, where at least some of the oils boil off under the vacuum (or partial vacuum) created by blowers 14. The remaining oils, the migrated gasses, and the boiled-off-oil gasses are the useful hydrocarbon products which are then mixed with scrubbing water as described above, and they are then evacuated via reformer output piping 10. The scrubbing water thus entrains certain of the useful gasses and oils, and also acts to keep the feedstock at a desired wetting level.

The above described reaction pyrolysis takes place in the reaction chamber 9 using either input gas (such as propane) via piping 20, or recirculated synthetic gas produced by the reformer itself via piping 325. In the electrolysis layer 611, the heat from the inefficiencies of a fuel cell process in the carbonate layer reaction causes the feedstock 511 to produce pyrolysis oils. The electrolysis layer 611 also produces useful hydrocarbons, paraffins, olefins, alcohols, and/or carbon dioxide which are products of a process known as Kolbe Electrolysis. These products are produced at the anode while hydrogen is evolved at the cathode, as will be described below. Decane and pentane, for example, are the predominant products from caproic acid, a common pyrolysis product. Other hydrocarbon products will depend on the feedstock, as different organic acids will evolve from the different materials. The electrolysis layer 611 typically ranges from about 350 degrees F. at the top thereof to about 900 degrees F. at the charcoal layer 712. The electrolysis layer 611 comprises oils, water, and wetted feedstock (from the pyrolysis oils typically produced at temperatures of 730 degrees F. and higher near the charcoal layer), and water and oils injected at line 6 and the water content of the feedstock itself, where some of the oils are from the lower layers.

Gravity and the stirrers gradually force reaction products from the electrolysis layer 611 downward into the charcoal layer 712, where the products more closely resemble charcoal at about 900-1800 degrees F. Like in the electrolysis layer 611, in the charcoal layer 712 carbon minerals migrate downward while useful oils and gasses migrate upward. Gas molecules such as syngas, and air introduced below the ash plate 12 (through the ash auger mechanism 15) and dissociated in the ash layer 911, react with the carbon in the charcoal layer 712 to produce some of the gases and oils that rise through the electrolysis layer 611.

The carbonate plasma layer 811 is where the hottest temperatures occur, producing a plasma at about 3500 degrees F. As with the charcoal layer 712, in the carbonate plasma layer 811, minerals migrate downward as they react to form crystalline solids, while useful oils and gasses migrate upward. This electrolyte (the natural mineral carbonates of the feedstock, or one or more catalysts that may be added to the feedstock) causes the transfer of electrons from incoming gases (e.g., syn gas), making it act like a fuel cell and providing the electric current used in the arcing in ash layer 911 below and in the charcoal layer 712 above and in the electrolysis layer 611. Preferably, the current generated would be about 600 amperes or higher, at a voltage of 8000 VDC or higher.

As the lower layers finish combustion, they produce an ash layer 911, which is perhaps 140 degrees F., and is eventually evacuated from the reformer through the bottom ash plate 8 using gravity and the ash auger 15, as described above. The incoming gases (air from below and gas from input line 20 and/or 325) are heated and dissociated in this layer as described below. The ash stirrer 5 helps keep the ash crushed to cause (i) the interstitial spaces preferable for arcing and (ii) movement of the ash over the outer perimeter of the ash plate 12. Note that while the temperatures inside the reaction chamber 9 may be quite high, the outer skin temperature of outer wall 13 rarely exceeds 140 degrees F. The vacuum (or low pressure) space between the inner wall 3 and the outer wall 13 insulates against the hotter inner chamber temperatures.

A preferred feature of the present invention is the "arcing and sparking" which preferably takes place predominantly in the carbonate plasma layer 811 and in the ash layer 911. This arcing and/or sparking causes the disassociation of hydrogen, nitrogen, and oxygen molecules into atoms, thus releasing much more energy, as will be described in greater detail below. See, for example, U.S. Pat. No. 4,472,172 to Sheer, et al., the entire contents of which are incorporated herein by reference. The present invention preferably makes use of an electrical current flow set in the reaction chamber 9 to cause this arcing and/or sparking With reference to the arrows in FIG. 4, the source of electrical energy is mostly in the carbonate plasma layer where carbon is separated from oxygen, producing electrons from the oxygen (see also FIG. 5); which electrons flow upward along metal inner wall 3. Since the inner wall 3 is electrically isolated from the outer wall 13, and since the electrolysis layer 611 is somewhat wetted, this layer attracts the current flowing in the inner wall 3. Electricity follows the path of least resistance, Ohms Law, and the electrical resistance to the metal in the outer wall 13 is higher than the wetted carbon materials in the electrolysis layer 611. Additionally, the liquids pumped back into the reformer through line 6 will contain certain salts that increase the electrical conductivity of the wetted area and act as an electrolyte for the electrolysis. The mineral content of the carbon layer increases down through the charcoal layer 712, which increases the resistance, aiding in the current flow up the inner wall 3 and across to the layer 611. Thereafter, the current is attracted downward through the layers 712 and 811 to the ash layer 911 and the metal ash plate 12. It is this potential difference within the layers that causes the arcing and sparking which provides the increased energy by disassociation of hydrogen and oxygen molecules, aided by the fact that the ash plate 12 is preferably not electrically coupled to the inner wall 3 (or has a relatively low conductance). Furthermore, the current flow may cause pyrolysis oils (which are produced in the electrolysis layer 611 as described above) to also produce hydrocarbons from the top of the charcoal layer 712 via the process of Kolbe Electrolysis as they move up through the electrolysis layer 611.

Figure 5:
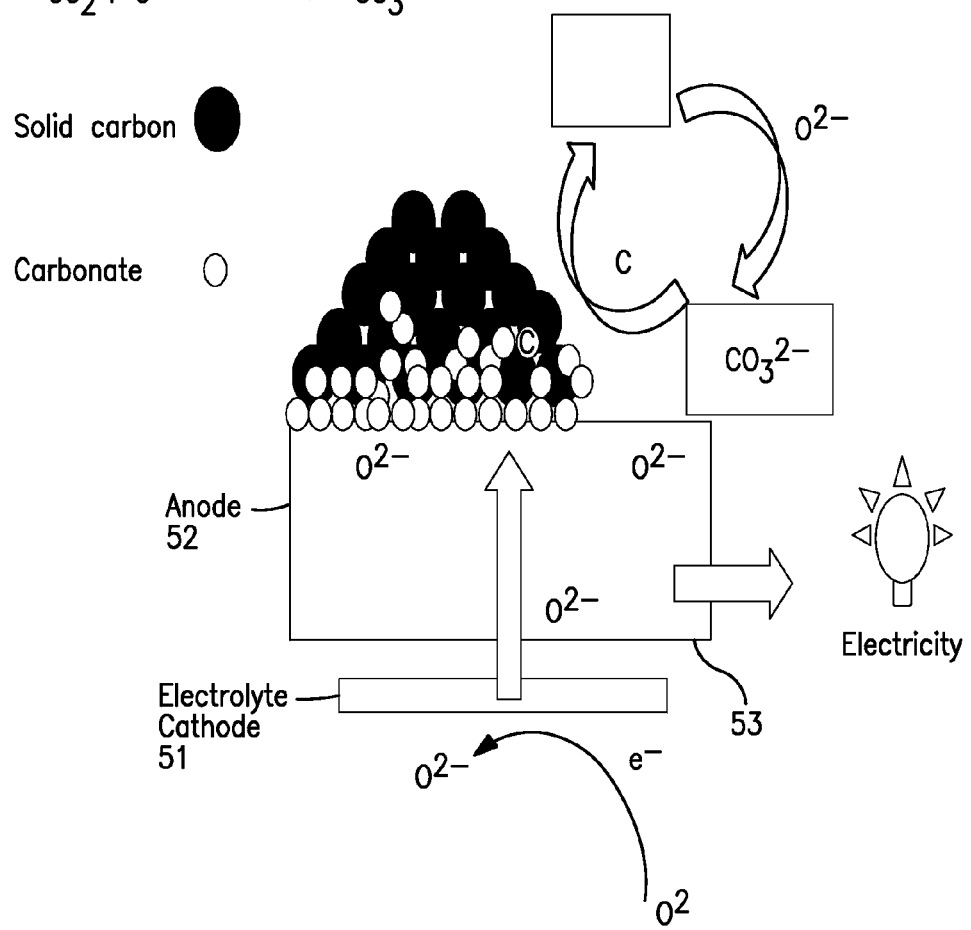
FIG. 5 is chemical process diagram of the FIG. 1 embodiment.

FIG. 5 schematically depicts the electro-chemical processes of a direct carbon fuel cell, formed in the present invention. The electrolyte includes at least the carbonate from the mineral content of the feedstock. The cathode includes at least the fuel stirrer(s) 7, the ash plate 12, and the ash layer 911. The anode includes at least the inner wall 3 and the cross members 4. Chemically, the oxygen gives up two (2) electrons at the electrolyte, i.e. the naturally occurring carbonates, which pass to the inner wall 3 and return to the cathode. This makes the reaction of carbon and oxygen result in carbon dioxide found in the gas. The same reaction may occur with hydrogen and nitrogen resulting in hydrocarbons as well as ammonia and amines, for example. In greater detail, FIG. 5 shows how the separation of the reactants carbon and oxygen, for example, produce electric current when separated by an electrolyte. Preferably, the electrolyte is a carbonate or molten carbonate. As air enters from ash auger 15 and reaches the electrolyte layer, electrons are released from each oxygen molecule, which electrons pass through the inner wall 3 and cross members 4. As with all electrical circuits, there has to be a completion through a load for the flow of current to occur. Here the current passes from the electrolyte layer 611, preferably being a portion of the load, and into the fuel stirrers 7. Current then moves down through fuel stirrer 7, to the ash layer 911, and ash plate 12, and back to the beginning of the electrolyte layer to complete the circuit. The current flow through the ash layer 911 causes the arcing and sparking described above, which can also be referred to as short circuiting. The oxygen ions now pass through the electrolyte layer to chemically react with the carbon to produce carbon dioxide, for example.

To provide greater detail to the above brief description of the processes within reaction chamber 9, the process by which the preferred embodiments utilize electrolysis of pyrolysis to reform synthesis gas into liquid will now be described. In the lower portion of the section 102 of the reformer, electrical generation is accomplished, at least in part, by the application of a direct carbon fuel cell, e.g., as described in U.S. Pat. No. 7,438,987 to Cooper, the entire contents of which are incorporated herein by reference. The direct carbon fuel cell is first used to ionize gases produced (or in the processes of being produced) in sections 101, 102, and 103, and returned to below the ash plate 12 via piping 32 and 20 and passed through the holes 212 of FIG. 3 to produce chemical reactions between carbon, the synthesis gas, and within the synthesis gas itself. See FIG. 5 for an illustration of the operation of a direct carbon fuel cell. Oxygen from the air that enters through ash auger 15 reacts with carbon to form carbon dioxide. When this reaction occurs, heat is produced, e.g., a fire in the fire place. However, in this and other fuel cell arrangements, the oxygen is separated from the carbon by an electrolyte. Oxygen has to give off two electrons to react with carbon, see FIG. 5. In a fire place, these electrons cause heat. In the reaction chamber 9, the electrons are in-part transferred by the electrolyte to the inner wall 3 producing some electric current rather than all heat. Electrons that do not get conducted as current cause the heat that produces the pyrolysis at the charcoal layer 712. The oxygen/carbon reaction is one example of a reaction that can occur in this layer.

Referring again to FIG. 5, in the preferred embodiments, the cathode 51 (including the fuel stirrer(s)) is extended through the anode 52 (including the inner wall 3). The current is produced, in part, by air introduced by induced draft through the ash auger 15, caused by the blowers 14 bringing in air through the ash auger 15 to provide oxygen from that air and around the outside edge of the ash plate 12 and to the carbonate electrolyte layer 811, to produce the current by the oxygen chemical reaction described above and illustrated in FIG. 5. The separation of carbon from the ash plate 12 as current collector (and from the ash) by an electrolyte 53 (being carbonates and other material in the feedstock in the carbonate plasma layer 811), causes the formation of ions in an aqueous solution, including but not limited to molten materials (e.g., plasma). Such electrolyte materials may include, but are not limited to, sodium, potassium, and other transition metal hydroxides, carbonates, and salts that naturally occur in biomass.

As the ash layer 911 is cooled into a crystalline structure by incoming synthesis gas and air (from, e.g., the ash outlet 151), it is referred to as ash and can be part of the cathode 51, along with the ash plate 12. Incoming air and synthesis gas are kept somewhat separate by filling the center portion of the ash plate 12 with gas, causing the air, in large part, to move up the outer wall 13 and through the gap between the inner wall 3 and the ash plate 12. Any ash that fuses or bonds together above or below the electrolyte 53 zone is broken and/or crushed by the stirring arms of the ash stirrer 5 and/or the fuel stirrers 7. The top arm of the ash stirrer 5 is preferably disposed above the ash plate 12, and is preferably operated in conjunction with another ash arm 81 (FIG. 1) disposed below the ash plate 8 to remove ash, as needed, to control the position of electrolyte 53 within the inner wall 3 of section 102 of the reformer.

Preferably, the ash plate 12 and the ash stirrer 5 are isolated from the inner wall 3, creating an electrical potential difference between the inner wall 3 and the fuel stirrers 7, and completing the electrical circuit through the feedstock material 511 and its constituents as it is reduced. Due to the higher resistance of the metal in the inner wall 3, the outer wall 13, and the fuel stirrer 7, the current will flow through the carbon, ash, and wet materials (layers 511, 611, 712, 811, and 911 of FIG. 4), is the path of least resistance.

The ash plate 12 is preferably supported by the outer wall 13 from below via the donut-shaped porous plate 66 or brackets (which may be electrically and/or thermally insulated from the outer wall) to allow ash to be removed over the entire periphery of the plate 12. The ash plate 12 is preferably larger in diameter than the inner wall 3 to maintain the ash level to a controlled depth so that ash is removed as needed rather than falling in an uncontrolled fashion. As the ash stirrer 5 is rotated, the circumferential gap between the ash plate 12 and the inner wall 3, and the inner wall cross members 4 act together to crush and/or break any fused ash or ash stuck together by other means, thus keeping the ash size appropriate in optimizing the arcing preferably used in the ionization of incoming synthesis gas.

The gas-to-liquids conversion, being a reaction between hydrogen and carbon, or hydrogen and nitrogen, for example, in the lower portion of section 102 preferably uses the conductivity, size, consistency, and movement of the ash to cause arcing, also referred to as sparks, between pieces of ash as they move. These arcs ionize components of the synthesis gas, known as dissociation from molecules into atoms. Arcing is considered the most efficient means of molecular dissociation but may not be the only means. Based on the Gibbs free energy equation ($G(T, p)=U+pV-TS$; where U is the internal energy in joules, p is pressure, V is volume in meters cubed, T is the temperature, and S is the entropy in joules per Kelvin) and reaction kinetics, the enthalpy, entropy, and free energy of the reaction for gas-to-liquids is dramatically increased over and above traditionally known gas-to-liquid operations, such as, but not limited to, Fischer-Tropsch and Haber-Bosch for reactions to occur near or below atmospheric pressure. The discovery that H atoms react with carbon spontaneously, instantaneously, and at low pressure, forming hydrocarbons was made by Avramenko in 1946. He passed hydrogen gas through an arc chamber then onto a carbon disk producing hydrocarbons at near-atmospheric pressures. His work used an external electrical energy input into the system where as the process according to the present invention preferably uses electrical energy generated by the system itself.

Other means of internal electrical power generation used in the present invention could include (but not be limited to) magnetohydrodynamics (MHD), pyroelectric electric, piezoelectric electric and ferroelectric electric effects. MHD is the flow of electrically conductive gases such as, but not limited to, hydrogen through a magnetic field in the inner wall 3 of section 102. The current flow in the inner wall 3 from other electrical effects of the ash from heat, pressure of the stirring arms, and/or the weight of material above the ash produces a magnetic field. The gas flow would be seeded by the carbonates, salts, and other electrically conductive materials in the ash. Other possible means of current flow in the inner wall could be, but are not limited to, the Seebeck Effect. Thomas Johann Seebeck first discovered the effect in 1821 which is a means of converting heat into electrical energy. Because these effects are traditionally static electricity, the arrangement of the fuel stirrer 7, the ash stirrer 5, the ash plate 12, and the inner wall 3 cause a potential difference for the electrical energy to be used for chemical reactions within the reactor rather than removed from the system and used externally.

The resulting reactions produce complex compounds. Reactions between hydrogen and carbon tend to yield aromatic hydrocarbons. Nitrogen and hydrogen can also yield ammonia. Ammonia reacts with aromatic hydrocarbons to produce primary, secondary, and tertiary amines. All of which have been found by analysis of the output oil, as will be detailed below.

Another compound found in the output oil is phenol, also found by chemical analysis (discussed below). The process for making phenols begins with aromatic hydrocarbons such as isopropyl benzene which is reacted with an alkaline such as caustic, carbonate or bicarbonate. The product of this reaction is phenol and acetone, which appear in the oil analysis as well.

The combined electrical effects, the inefficiencies, and the alternating frequency caused by current arcing in the ash produce direct heat as well as induction heating in section 102 for the purpose of pyrolysis of the incoming feedstock. The products of the pyrolysis undergo Kolbe electrolysis, the electro-chemical conversion of organic acids to hydrocarbons. See, for example, U.S. Pat. No. 6,238,543, to Law, Jr., the entire contents of which are incorporated herein by reference. Various factors such as temperature, current density, electrode material, and electrolyte material affect the hydrocarbon production distribution. Studies indicate that low temperature and low current density with nickel or nickel alloy metal cathodes with platinum or chromium anodes (preferably used in the present invention) have better yield percentages. The reformer construction according to the present invention preferably uses nickel alloy, or better, in the fuel stirrer arms 7; having multiple arms attached to a central rotatable shaft and staggered around the center shaft as they move down; making sure that no part of the stirrer assembly comes into contact with the inner wall 3.

Electrolysis of acids to produce hydrocarbons has been studied for more than 200 years with many questions as to the exact mechanism or operating conditions. Rheinold and Erman were the first to investigate electricity as a potential oxidizing or reducing agent in aqueous solutions of alcohol. In 1830, Ludersdorff undertook the first detailed studies of products using various electrode materials. Kolbe made his breakthrough studies in 1845. To make the most of the conditions necessary for electrolysis, all of the conditions are at least partially controllable in the preferred embodiments. Temperature may be controlled by injection of liquid from the oil/water separation tank 16 and/or the amount and velocity of the feed gas. The bottom layers in tank 16 (where heavy liquids and tars, for example, collect) may be pumped back into the top of section 101 onto the feedstock 511, via line 11. Such tank-bottom sludge may be pumped back not only for temperature control, but for the reforming of those components as well. The output from tank 16 to line 161 may be made height-adjustable for different feed stocks and/or process speeds. Liquid from the tank 16 layer above the bottom layers is preferably pumped back to section 101 via line 6 for both temperature control and scrubbing as the gas/liquid output from the reactor passes through the piping 10 and the blowers 14, as it is moved to the gas/liquid separator/scrubber 17. As described above, inside the reaction chamber 9, current density is passed through the rising pyrolysis oil as it moves through the cross members 4. Controlling the frequency and the speed of the rotation of the fuel stirrer arms 7 causes current to be at least partially consumed by electrolysis of the pyrolysis oils. Electrode material has already been discussed above. Electrolyte material is a natural component of the feedstock, but could be altered by addition of other catalytic materials, if needed.

The pyrolysis of the feedstock mostly occurs near the charcoal layer 712 lower in the inner wall section above ash plate 12 and the ash layer 911 (the fuel cell area). Production of organic acids, acetic acid, and other acidic material is well known in pyrolysis. Here, by placing the blowers 14 to pull from the reformer, a vacuum (or partial-vacuum) pyrolysis process is set up. Typically, temperatures of 730 degrees F. to 932 degrees F. are required for the reaction to occur. The top third of the inner wall section (reaction chamber 9) is preferably controlled to be around 350 degrees F. to around 425 degrees F. Because of this temperature control, the produced pyrolysis oils rise up through the electrolysis section 611 of the reaction chamber 9. Compounds such as acetic acid coming in contact with the entering feed stock assists in the pyrolysis. This process is known as acid hydrolysis. Studies have shown that pretreatment of biomass by a mild acid hydrolysis to remove hemicellusose followed by pyrolysis causes a higher yield of fermentable sugars. Pentose and hexose, for example, from acid hydrolysis blend with anhydro sugars customarily recovered from pyrolysis. These studies have also shown a decrease in the amount of water from vacuum pyrolysis after pretreatment and the increase of levoglucasan, for example, and a decrease in xylan. Xylan has been shown to be a primary contributor to the formation of tars in the pyrolysis process. Because the pyrolysis occurs below the feedstock and rises back up, it pretreats the incoming feedstock.

As noted above, wetting of the feedstock is an advantageous feature according to the preferred embodiments, allowing for a broader range of feedstock materials, and producing more useful products. The wetting is preferably an internal process. At the top of the carbon layer, where the fuel cell process occurs, is where the pyrolysis preferably occurs. The pyrolysis oils rise back through the feedstock causing some of the wetting. Acetic acid is used to wet material for pyrolysis and is a natural component of pyrolysis. The acetic acid is broken down in the electrolysis. Also, pumping of the bottoms from the oil/water separator 16 is a wetting process, and providing these to the feedstock through pipes 6 and 11 assists in controlling the wetness of the feedstock. Supplemental wetting of the feedstock may be used outside the reformer to add moisture if the material is too dry. For example, some kiln dried materials may have water added to bring the feedstock moisture content up to 50% or so.

As also noted above, the leveling arm 2 is used in section 101 to sweep the feedstock material from under the feed auger 1 to bring the material into the reformation chamber and to maintain an even bed height. The auger 1 is preferably fed through an airlock system 113 (FIG. 1B) to prevent substantial amounts of air from entering the section 101 and damaging the vacuum (or partial vacuum) therein; and air trapped in the chambers of the air lock 113 is preferably removed using the vacuum of the lower section 103 below the ash support 8, which is connected to the outer wall 13 of the reformer.

4. In Operation

In operation, the at least one processor 410 controls the various augers, valves, blowers, pumps, and motors as described below. Preferably, the structures are controlled to feed approximately 0.25 to 10 tons of chicken litter per day into the reformer. This will typically produce approximately: 2 to 100 pounds per hour of ash fertilizer (depending on the mineral content of the feedstock; e.g., pine is 0.25%, rice straw is 12%); 3 to 150 gallons of oil per hour; and 1,200 to 48,000 cubic feet of syngas per hour.

Once the reformer unit is fully started with feedstock entering the reformer and the propane gas ignited and being fed to the reaction chamber 9, the propane flow is kept at a level where the fire preferably stays toward the bottom of the inner reaction chamber 9. The temperature of the outer wall 13 is monitored (e.g., with one or more thermocouples), and when the return synthetic gas becomes combustible (e.g., the combustion reaches a threshold such as, 150 degrees F.) the burner is turned off, the air inlet on the burner is closed, and the return synthetic gas flow to the burner tube is opened. When the ash layer 911 preferably reaches 2 to 4 inches (preferable maximum for the current embodiments) the hydrogen rich syngas flowing upward through the ash produces first a pyroelectric charge which will discharge as an electric arc in hydrogen which has a conductivity of 187 mW/m-K compared to air at 26.2 mW/m-K. This arcing between the pieces of ash causes the hydrogen to dissociate, leading to the reaction example $8H+3C \rightarrow C_3H_8$, thermodynamically resulting in 1848 KJ of energy release compared to a gasification reaction of the same amount of carbon ($3C+2O2 \rightarrow 2CO+CO_2$) at 614.5 KJ. This makes the reaction according to the present invention at least 3 times that of the prior art energy release, and an energy content comparison output at 5 time that of gasifiers. The hydrogen conversion rate is about 60% to 70%.

Other thermal and kinetic energy conversion methods may include piezoelectric, ferroelectric, and MHD power generation produced by the flow of the conductive hydrogen through an electric field produced by current flow through the chamber walls. Another consideration would be a fuel cell, solid oxide to be specific. The combustion of hydrogen and oxygen in the ash, or oxide, would produce electric charge, and just like a fuel cell, would arc between pieces like cracks and fissures (one of the inefficiencies). These same inefficiencies are problems in fuel cells, MHD, and would be in pyroelectric generators. But it is this inefficiency that is taken advantage of in the reformer according to the present invention.

It is well worth noting that the arcing dissociates nitrogen, oxygen, and most any diatomic molecule from the air. The disassociation of nitrogen is a strong indication of the nitrogen found in the ash according to the present invention. These same arcs comprise plasma electrolysis which has been reported in hydrogen production from water at 80 times that of the Faraday current prediction. The most accepted explanation is thermal decomposition. All of the thermoelectric conversion methods, as well as kinetic conversion methods, have the conditions to produce current and voltage at varying degrees. It is this combination that is most likely providing the beneficial results according to the present invention.

Once reaction from the starting (ignition) process has produced a layer of ash 911, above this a (at least partially) static plasma zone forms in the layer of ash; and charcoal 712 or carbonate 811 would be the more likely zone(s) for the magneto-hydrodynamic conversion of the kinetic motion of synthesis gas (primarily hydrogen for the conversion) within a magnetic field to produce the electricity. Charge produced in the ash, once the ash has reached the bottom of the inner reactor 9, would travel up the reactor wall 3 and produce the magnetic field, as noted above. Though it is not considered to be highly energetic, it is expected to be occurring. Current produced by this MHD generator would also travel predominantly through the carbon, causing electrolysis to occur, with carbon being one electrode and minerals in the biomass feedstock being the other. Hydrogen itself could act as the negative electrode and reduce both free water and hygroscopic water. This process occurs, producing synthesis gas, until the carbonate layer 811 moves high enough so that the current can move through the inner wall 3 and ash layer 911 to begin the other processes.

Another reaction that occurs in the reformer is hydrotreating of the pyrolysis oils. Heat generated from the formation of hydrocarbons in the diminishing zones of ash 911 and carbon 811 pyrolizes the incoming biomass where light oils are removed by boiling at low pressures in the upper section 101. Heavy oils will move down through the bed where atomic hydrogen will hydrotreat this oil. See, for example, the catalytic process for the treatment of organic compounds discussed in U.S. Pat. No. 7,387,712, the entire contents of which are incorporated herein by reference. A process for the catalytic reaction of organic compounds is provided, in which the organic compounds are contacted with a catalyst comprising an interstitial metal hydride (having a reaction surface) to produce a catalyst-organic compound mixture; energy is applied, monatomic hydrogen is produced at the reaction surface of the interstitial metal hydride, and the organic compounds are reacted with the monatomic hydrogen. Reactions accomplished by this process include petroleum hydrocracking and hydrotreating processes. "Interstitial" means the small spaces within the material, and metal hydrides are materials that can form from the mineral content of the feedstock. When steam reacts with carbon, it will form carbon monoxide and hydrogen. Momentarily, hydrogen will exist as monatomic, i.e. an atom, while it is produced in the presence organic compounds produced within the process, this reaction can occur.

5. Results

Initial tests with chicken litter have been very impressive. The present invention provides 10× waste matter conversion efficiency vs. existing technology of gasification or pyrolysis. The present invention tolerates water content in the feedstock of up to 75 percent by weight vs. 15 percent by weight maximum water content for existing technologies. Feedstock with a water content of 15 to 50 percent is presently preferred for use in the present invention. This means that most contemplated feed stocks do not have to undergo a pre-process drying step. The present invention may process any carbon-based wet waste, such as animal waste, biomass, municipal solid waste, etc. The process outputs are (i) semi-refined petroleum high in aromatics with little or no sulfur, (ii) synthesis gas having a hydrogen to CO Ratio of about 2.2:1, and (iii) fertilizer ash high in nutritional value for agriculture. Notably, the present process generates very little or no harmful fugitive emissions. In addition, the present invention is quite green in that it helps the environment. It is well known that animal waste emits methane with 25× the global warming potential of $CO_2$. For example, 100 tons of chicken litter per day has the same yearly global warming potential impact as burning >30,000,000 gallons of gasoline. Thus, the present invention removes harmful substances from the environment. Further, the ash fertilizer according to the present invention may be stored and transported more economically, and provides nutritional value with none of the chemical or biological risks associated with using raw chicken litter as fertilizer.

The present invention is thus an internally-regenerated, high-energy, sustained reaction process that converts carbon based feed stocks into refinable hydrocarbons and other compounds that can be used to produce valuable fuel, chemical byproducts, and energetic gas. An externally generated high-temperature plasma field converts the feed stocks into their simplest molecules—hydrogen, carbon monoxide, and other compounds, forming a synthetic gaseous mixture that may be used to generate electricity and/or produce valuable fuel and chemical byproducts. Pyrolysis preferably heats the waste in an oxygen-deprived environment, where material combusts to produce heat, carbon dioxide, and a variety of oleo chemicals.

As one example, a 10-15 tons of chicken litter feedstock per day reformer according to the present invention produces 60 barrels of semi-refined petroleum per day (24,000 barrels per year); 0.33 tons of ash fertilizer per day (100 tons per year); and 633,600 cubic feet of synthetic gas per day (215,424,0000 cubic feet per year) with recirculation of the gas and based on 340 days per year operation. This removes much harmful material from the environment, provides large quantities of diverse energy, and causes little or no pollution by the process.

ARK GAS™. A comparison of the synthetic gas provided by the present invention (termed ARK GAS™) with gas produced by typical gasifiers reveals that the syn gas according to the present invention has a unique chemical signature having, for example, over 2× more hydrogen, which may be used to generate electrical power and/or in high value chemicals via catalysts or bio-digesters. See Tables 1 and 2 below.

TABLE 1

Comparison of Typical Syngas with ARK GAS ™

|  | Gasifier Mole % | Present Invention Mole % |
|---|---|---|
| Hydrogen | 22.32 | 47.68 |
| Nitrogen |  | 25.98 |
| Methane |  | 0.90 |
| Carbon Monoxide | 40.81 | 18.35 |
| Ethane |  | 0.18 |
| Water | 24.29 | 0.44 |

TABLE 2

Comparison of Typical Syngas with ARK GAS ™

|  | Gasifier | Present Invention |
|---|---|---|
| Feedstock $H_2O$ Limit | 15% | 75% |
| Pure Oxygen Required | Yes | No |
| Pressure | As High As 600 psi | Low 15 psi |
| Output Temperature | >1000° F. | <140° F. |
| Explosion Risk | Yes | No |
| Water Cooling Required | Yes | No |
| Harmful Emissions | Yes | No |
| Output - Present Invention SynGas H:CO Ratio | 1:2 | 2:1 |
| Solid Output | Molten Slag | Fertilizer |
| Present Invention Semi-refined Petroleum | No | Yes |

Chemical analyses of the unique signature of the syn gas produced in accordance with the present invention is set forth below in Tables 3, 4, 5, and 6.

TABLE 3

| COMPONENTS | METHOD# | MOLE % | LIQ. VOL % | WEIGHT % |
|---|---|---|---|---|
| Hydrogen | D-1945-81 | 47.681 | 40.654 | 5.825 |
| Nitrogen | D-1945-81 | 25.982 | 27.030 | 44.106 |
| Methane | D-1945-81 | 0.905 | 1.455 | 0.880 |
| Carbon Monoxide | D-1945-81 | 16.350 | 19.572 | 31.147 |
| CO2 | D-1945-81 | 6.320 | 10.221 | 16.855 |
| Ethane | D-1945-81 | 0.182 | 0.462 | 0.332 |
| Water | D-1945-81 | 0.439 | 0.238 | 0.479 |

TABLE 3-continued

| COMPONENTS | METHOD# | MOLE % | LIQ. VOL % | WEIGHT % |
|---|---|---|---|---|
| Propane | D-1945-82 | 0.141 | 0.369 | 0.377 |
| Isobutane | D-1945-81 | 0.000 | 0.000 | 0.000 |
| n-Butane | D-1945-81 | 0.000 | 0.000 | 0.000 |
| Isopentane | D-1945-81 | 0.000 | 0.000 | 0.000 |
| n-Pentane | D-1945-81 | 0.000 | 0.000 | 0.000 |
| Hazanes+ | D-1945-81 | 0.000 | 0.000 | 0.000 |
| Totals | | 100.000 | 100.000 | 100.000 |

TABLE 4

Calculated Values:

| MOLECULAR WEIGHT | 16.502 |
|---|---|
| HEATING VALUE BTUGI/DSCF @ 14.696 psia & 60° F. = | 170.71 |
| HEATING VALUE BTUGI/DSCF @ 14.73 psia & 60° F. = | 171.10 |
| HEATING VALUE BTUNI/DSCF @ 14.696 psia & 60° F. = | 206.38 |
| COMPRESSIBILITY FACTOR @ 14.696 psia & 60° F. = | 0.99053 |
| RELATIVE DENSITY @ 14.696 psia & 60° F. = | 0.7367 |

TABLE 5

| COMPONENTS | METHOD# | MOLE % | LIQ. VOL % | WEIGHT % |
|---|---|---|---|---|
| Hydrogen | D-1945-81 | 79.134 | 68.553 | 16.804 |
| Air O2 & N2 | D-1945-81 | 5.020 | 5.306 | 14.813 |
| Methane | D-1945-81 | 1.313 | 2.145 | 2.219 |
| Carbon | D-1945-81 | 0.273 | 0.296 | 0.805 |
| CO2 | D-1945-81 | 13.425 | 22.059 | 62.235 |
| Ethane | D-1945-81 | 0.216 | 0.557 | 0.684 |
| Unsaturated | D-1945-81 | 0.413 | 0.536 | 1.483 |
| Propane | D-1945-81 | 0.206 | 0.547 | 0.957 |
| Isobutane | D-1945-81 | 0.000 | 0.000 | 0.000 |
| n-Butans | D-1945-81 | 0.000 | 0.000 | 0.000 |
| Isopentane | D-1945-81 | 0.000 | 0.000 | 0.000 |
| n-Pentane | D-1945-81 | 0.000 | 0.000 | 0.000 |
| Hazanes+ | D-1945-81 | 0.000 | 0.000 | 0.000 |
| Totals | METHOD# | 100.000 | 100.000 | 100.000 |

TABLE 6

| MOLECULAR WEIGHT | 9.494 |
|---|---|
| ISENTROPIC FACTOR, k @ 14.696 psia & & 60° F. | 1.3823 |
| MOLAR MASS RATIO @ 16.696 psia & & 60° F. | 0.32779 |
| HEATING VALUE BTUGI/DSCF @ 14.696 psia & & 60° F. | 282.33 |
| HEATING VALUE BTUGI/DSCF @ 14.73 psia & & 60° F. | 282.98 |
| HEATING VALUE BTUNI/DSCF @ 14.696 psia & & 60° F. | 240.17 |
| VISCOSITY centipoise |(g)| @ 14.696 psia & & 60° F. | 0.01384 |
| SPECIFIC HEAT BTU/lbm * 'F @ 14.696 psia & & 60° F. | 0.75639 |
| COMPRESSIBILITY FACTOR @ 14.696 psia & & 60° F. | 0.99791 |

Since the syn gas according to the present invention has high hydrogen content (preferably above 35 mole percent, more preferably above 40 mole percent, even more preferably above 45 mole percent), it can be used for a wide variety of applications. It can be used in a boiler to generate electricity, and/or in a power generator to power a gas turbine and/or fuel cells. The hydrogen may be extracted to be used in refinery hydrotreating, transportation fuels, and/or fertilizers. Likewise, methanol may be extracted and used to produce formaldehyde, methyl acetate, acetic anhydride, acetic acid, vinyl acetate monomer, polyvinyl acetate, ketene, diketeme and derivatives, ethylene propolene, polyolefins, oxy chemicals, dimethyl ether, gasoline, Fischer-Tropsh materials, wax, diesel/kerosene, naptha, and/or ethanol. Moreover, the reforming apparatus according to the present invention uses a geographic footprint of only 12 feet long, 8 feet wide, 7 feet high, which is much, much less that the footprint of a typical multi-acre gasification plant. Note that the syngas according to the present invention has very low amounts of methane (preferably less than about 5 mole percent, more preferably less than about 3 mole percent, even more preferably less than about 1 mole percent). The Hydrogen will preferably be in the range of 30 to 80 mole percent, more preferably, 35 to 70 mole percent, even more preferably, 40 to 60 mole percent, yet more preferably, 43 to 55 mole percent, even more preferably, 45 to 50 mole percent, most preferably, 47.69 mole percent. The Nitrogen will preferably be in the range of 4 to 40 mole percent, more preferably, 10 to 37 mole percent, even more preferably, 15 to 34 mole percent, yet more preferably, 20 to 32 mole percent, even more preferably, 23 to 30 mole percent, most preferably, 25.98 mole percent. The Methane will preferably be in the range of 0.1 to 2 mole percent, more preferably, 0.2 to 1.8 mole percent, even more preferably, 0.3 to 1.5 mole percent, yet more preferably, 0.6 to 1.2 mole percent, even more preferably, 0.8 to 1.0 mole percent, most preferably, 0.9 mole percent. The Carbon Monoxide will preferably be in the range of 6 to 25 mole percent, more preferably, 10 to 23 mole percent, even more preferably, 13 to 21 mole percent, yet more preferably, 15 to 20 mole percent, even more preferably, 17 to 19 mole percent, most preferably, 18.35 mole percent. The Ethane will preferably be in the range of 0 to 1 mole percent, more preferably, 0.03 to 0.7 mole percent, even more preferably, 0.05 to 0.5 mole percent, yet more preferably, 0.07 to 0.4 mole percent, even more preferably, 0.1 to 0.3 mole percent, most preferably, 0.18 mole percent. The water will preferably be in the range of 0 to 1 mole percent, more preferably, 0.1 to 0.8 mole percent, even more preferably, 0.2 to 0.7 mole percent, yet more preferably, 0.3 to 0.6 mole percent, even more preferably, 0.4 to 0.5 mole percent, most preferably, 0.44 mole percent.

ARK OIL™. The oil produced by the present invention (termed ARK OIL™) is an engineered petroleum product valuable as produced (semi-refined) or with further refining. This oil has a unique signature making it suitable for a wide variety of useful applications. A Composition Breakdown Gas Chromatography/Mass Spectrometry, per ASTM 05739 was conducted on the chicken-litter oil product in January 2014. The sample was analyzed on a gas chromatograph/ mass spectrometer. A library search was performed on the collected data using the Wiley 138 Library and the NIST 98 Library. Together the libraries contain approximately 200,000 compounds. The top layer of the sample was analyzed as received. These data are based on the chromatographable components found. If heavier compounds or polymers were present they were not seen on the gas chromatograph/mass spectrometer. No corrections for the inorganic content, if present, or water content was performed. The identities and approximate concentrations that follow are based on the best spectral comparisons from the libraries and the total ion relative areas of the peaks observed. The material found consists primarily of light tri- and tetramethyl-benzenes and lesser amounts alkyl-naphthalene compounds. Lesser amounts of other organic compounds were also observed, which were comprised of indenes, saturates, olefins, ketones, amines, acids, alcohols, aldehydes, esters and other oxygenated compounds. The approximate concentration and organic chemical types are as follows:

TABLE 7

| Tentatively Identified Compounds Found | Approximate Concentration Ratios Relative to Extractables Percent by Weight |
|---|---|
| Isoparaffins | 0.7 |
| Naphthenics | 0.5 |
| Mono-aromatics mostly trimethyl benzenes | 65.7 |
| Di-aromatics | 18.5 |
| Poly-aromatics | 2.4 |
| Acids, other carboxylic acids | 0.8 |
| Alcohols | 0.4 |
| Aldeyhdes | 0.2 |
| Amines and other nitrogen containing compounds | 1.3 |
| Esters (organic acid esters) | 0.8 |
| Indenes | 3.2 |
| Ketones | 0.7 |
| Olefins | 1.1 |
| Other low level organic compounds | 3.7 |
| Total | 100. |

TABLE 8

| | |
|---|---|
| Density of Petroleum Products, Hydrometer, ASTM D1298. g/cm$^3$ @ 60° F. | 0.9543 |
| API Gravity @ 60° F. | 16.63 |

A similar analysis was undertaken, but without the use of the cross-members 4 in the reaction chamber 9. The results are shown in Table 9.

TABLE 9

| Tentatively Identified Compounds Found | Approximate Quantification Percent by Weight |
|---|---|
| Normal paraffins | 3.7 |
| Iso paraffins | 11.4 |
| Cyclic paraffins (naphthenes) | 24.4 |
| Mono aromatics (including alkyl benzenes) | 0.9 |
| Di aromatics (including alkyl naphthalenes) | 3.6 |
| Poly aromatics (including alkyl poly aromatics) | 1.6 |
| Organic acids | 2.4 |
| Alcohols | 8.8 |
| Aldehydes | 0.2 |
| Amides | 1.9 |
| Amines and other heterocyclics | 3.4 |
| Esters (acid esters and phthalate esters) | 0.5 |
| Indenes | 2.9 |
| Ketones | 3.7 |
| Olefins | 11.0 |
| Phenolics | 2.9 |
| Organo nitrites | 2.6 |
| Halogen containing organics | 5.8 |
| Oxygenates | 0.8 |
| Others | 7.5 |
| Total | 100.0 |

Experiments show that most feed stocks used in the present invention will produce useful oils having approximately the following make-up shown in Table 10.

TABLE 10

| Compounds | Percent By Weight |
|---|---|
| isoparaffins | 0.2 to 15.0 |
| naphthenics | 0.1 to 15.0 |
| mono-aromatics | 3.0 to 75.0 |
| di-aromatics | 0 to 40.0 |
| poly-aromatics | 0 to 15.0 |
| acids | 0.1 to 3.0 |
| alcohols | 0 to 15.0 |
| aldehydes | 0.1 to 3.0 |
| amines | 0.1 to 7.0 |
| esters | 0.1 to 3.0 |
| indenes | 0.1 to 7.0 |
| ketones | 0.1 to 7.0 |
| olefins | 0.1 to 30.0 |
| low level organic compounds | 0.1 to 11.0 |

Thus, the preferred embodiments can provide an oil made of pyrolysis compounds that have undergone electrolysis, and compounds made in an electric arc gas to liquids process. The composition of the feedstock is believed to be the principle driver (not exclusive) to the paraffin and olefins content. Inefficiencies in this electrolysis process may yield alcohols, acids, phenols, and nitriles. The gas-to-liquids operation of the electric arc process described above produces aromatics, amines, amides, ketones, indenes; the composition of each depends on the amount of gas converted in electric arc gas to liquids. The isoparaffins will preferably be in the range of 0.2 to 15 percent by weight, more preferably, 0.3 to 10 percent by weight, even more preferably, 0.4 to 7 percent by weight, yet more preferably, 0.5 to 4 percent by weight, even more preferably, 0.6 to 1 percent by weight, most preferably, 0.7 percent by weight. The naphthenics will preferably be in the range of 0.1 to 15 percent by weight, more preferably, 0.2 to 10 percent by weight, even more preferably, 0.3 to 5 percent by weight, yet more preferably, 0.4 to 1 percent by weight, most preferably, 0.5 percent by weight. The mono-aromatics will preferably be in the range of 3 to 75 percent by weight, more preferably, 10 to 73 percent by weight, even more preferably, 30 to 71 percent by weight, yet more preferably, 50 to 69 percent by weight, even more preferably, 60 to 67 percent by weight, most preferably, 65 percent by weight. The di-aromatics will preferably be in the range of 0 to 40 percent by weight, more preferably, 5 to 35 percent by weight, even more preferably, 10 to 30 percent by weight, yet more preferably, 12 to 25 percent by weight, even more preferably, 14 to 20 percent by weight, most preferably, 18 percent by weight. The poly-aromatics will preferably be in the range of 0 to 15 percent by weight, more preferably, 0.5 to 10 percent by weight, even more preferably, 1 to 7 percent by weight, yet more preferably, 1.5 to 4 percent by weight, even more preferably, 2 to 3 percent by weight, most preferably, 2.4 percent by weight. The alcohols will preferably be in the range of 0 to 15 percent by weight, more preferably, 0.1 to 10 percent by weight, even more preferably, 0.2 to 5 percent by weight, yet more preferably, 0.3 to 2 percent by weight, most preferably, 0.4 percent by weight. The aldehydes will preferably be in the range of 0.1 to 3 percent by weight, more preferably, 0.3 to 10 percent by weight, even more preferably, 0.4 to 7 percent by weight, yet more preferably, 0.5 to 4 percent by weight, even more preferably, 0.6 to 1 percent by weight, most preferably, 0.7 percent by weight. The amines will preferably be in the range of 0.1 to 7 percent by weight, more preferably, 0.4 to 5 percent by weight, even more preferably, 0.7 to 3 percent by weight, yet more preferably, 1.0 to 2 percent by weight, even more preferably, 1.1 to 1.5 percent by weight, most preferably, 1.3 percent by weight. The esters will preferably be in the range of 0.1 to 3 percent by weight, more preferably, 0.3 to 2.5 percent by weight, even more preferably, 0.5 to 2 percent by weight, yet more preferably, 0.6 to 1.5 percent by weight, even more preferably, 0.7 to 1 percent by weight, most preferably, 0.8 percent by weight. The indenes will preferably be in the range of 0.1 to 7 percent by weight, more preferably, 0.5 to 6 percent by weight, even more preferably, 1 to 5 percent by weight, yet more preferably, 1.5 to 4.5 percent by weight, even more preferably, 2 to 4 percent by weight, most preferably, 3.2 percent by weight. The ketones will preferably be in the range of 0.1 to 7 percent by weight, more preferably, 0.2 to 6 percent by weight, even more preferably, 0.3 to 5 percent by weight, yet more preferably, 0.4 to 3 percent by weight, even more preferably, 0.5 to 1 percent by weight, most preferably, 0.7 percent by weight. The olefins will preferably be in the range of 0.1 to 30 percent by weight, more preferably, 0.4 to 20 percent by weight, even more preferably, 0.6 to 10 percent by weight, yet more preferably, 0.8 to 5 percent by weight, even more preferably, 0.9 to 2 percent by weight, most preferably, 1.1 percent by weight.

The oil according to the preferred embodiments thus shows a unique mixture of highly complex compounds not typically found in natural crude oil or products such as Fischer-Tropsch oils, but has compounds that are commonly man-made. Notably missing from the analysis, or only in small quantities, are organic acids seen in pyrolysis oils, such as levoglucasan and acetic acid, and xylan.

The properties of the thus-produced ARK OIL™ may be adjusted by adding certain additives to the waste litter before pyrolysis. Additives include Arnosoak, a proprietary litter amending agent, and/or wood shavings. The amount of Arnosoak incorporated into litter may be from about 0.1% to about 40% by weight of the dry litter, more preferably from about 1% to about 20% by weight of the dry litter. Thus, Arnosoak may be used to control the pH of the oil. The pH of the untreated oil may range from 6 to 8, but with the addition of Arnosoak, the pH range of the oil can reduced to as low as 4 depending on the amount of Arnosoak added to the litter before the pyrolysis. Adding a solvent to the oil may be provided for better storage. In certain embodiments, the solvent added to the oil is ethanol, methanol, acetone, or water. When added, the solvents may be added at a concentration of about 1% to about 10% by weight of the oil, with a preferred concentration of 10% by weight of the oil.

ARK SOIL™. The ash fertilizer produced in accordance with the present invention (termed ARK SOIL™) also has a unique signature making it attractive as an all-purpose organic fertilizer. This ash fertilizer will reduce the transported volume and transportation costs associated with animal waste used as fertilizer. The ash fertilizer according to the present invention contains similar nutritional value for agricultural crops without any biological and chemical threats posed by the raw waste. An analysis of the fertilizer was conducted by the Agricultural Diagnostics Laboratory of the University of Arkansas at Fayetteville, with results shown below in Table 11. Other analyses of ARK SOIL™ have shown carbon content of 46 percent. Preferably, the fertilizer according to the present invention will have a high Nitrogen content, in the range of 0.1 to 3 percent by weight, more preferably, 0.3 to 5 percent by weight, even more preferably, 0.6 to 4 percent by weight, yet more preferably, 0.8 to 3 percent by weight, even more preferably, 1 to 2 percent by weight, most preferably, 1.2 percent by weight.

TABLE 11

| | Procedure: Digestion with EPA Method 3050 digestion —HNO3/HCl, analysis by N/C by combustion | | |
|---|---|---|---|
| Lab. No. | M60993-rep 1 | M60993-rep 2 | M60993-rep 3 |
| Sample No. | ash | ash | ash |
| Manure type | ash | ash | ash |
| *Total on as-received basis | | | |
| Total % N | 1.21 | 1.21 | 1.01 |
| Total % Carbon | 12.85 | 12.91 | 11.04 |
| Total % P | 4.90 | 5.42 | 5.17 |
| Total % K | 8.44 | 8.55 | 7.92 |
| Total % Ca | 6.93 | 8.17 | 7.59 |
| Total % Mg | 1.70 | 1.7 | 1.67 |
| Total % S | 1.10 | 1.17 | 1.15 |
| Na, mg/kg | 20890 | 21070 | 21080 |
| Fe, mg/kg | 9000 | 9180 | 13590 |
| Mn, mg/kg | 1486 | 1486 | 1454 |
| Zn, mg/kg | 1473 | 1519 | 1402 |
| Cu, mg/kg | 1122 | 1026 | 1065 |
| B, mg/kg | 125 | 119.6 | 118 |
| NOS—N, mg/kg | 20 | only 1 rep run | only 1 rep run |
| NH4—N, mg/kg | 24 | only 1 rep run | only 1 rep run |
| Arsenic, mg/Kg | 51 | 45 | 49 |
| Cadmium, mg/Kg | 2 | 2.7 | 2 |
| Chromium, mg/Kg | 20 | 25.9 | 19 |
| Nickel, mg/Kg | 38 | 41.6 | 38 |
| Lead, mg/Kg | 9 | 10.7 | 10 |
| Tot Diss. P, mg/Kg | 1031 | 1110.0 | 1131 |
| lbs/ton on "as-is" basis | | | |
| Total N | 24.20 | 24.2 | 20.20 |
| Total Carbon | 257.00 | 258.2 | 220.8 |
| Total P | 98.00 | 108.4 | 103.4 |
| Total K | 168.80 | 171.0 | 158.4 |
| Total Ca | 138.60 | 163.4 | 151.8 |
| Total Mg | 34.00 | 34.4 | 33.4 |
| Total S | 22.00 | 23.40 | 23.00 |
| Total Na | 41.76 | 42.1 | 42.2 |
| Total Fe | 18.00 | 18.4 | 27.2 |
| Total Mn | 2.97 | 3.0 | 2.9 |
| Total Zn | 2.95 | 3.0 | 2.8 |
| Total Cu | 2.24 | 2.1 | 2.1 |
| Total B | 0.25 | 0.2 | 0.2 |
| NO3—N | 0.04 | | |
| NH4—N | 0.05 | | |
| Total Arsenic | 0.100 | 0.090 | 0.100 |
| Total Cadmium | 0.004 | 0.005 | 0.004 |
| Total Chromium | 0.041 | 0.052 | 0.039 |
| Total Nickel | 0.076 | 0.083 | 0.076 |
| Total Lead | 0.018 | 0.021 | 0.020 |
| Total Diss P | 2.1 | 2.2 | 2.3 |

Mass-energy balance studies have been performed on the present invention, with the results shown below in Table 12.

TABLE 12

| Mass & Energy Balance | | | |
|---|---|---|---|
| NH3 In | | 17.85 | |
| Sludge In | | 3.05 | |
| Return Gas Input | | 150.75 | |
| Air Input | | 71.00 | Lbs/Hr |
| Litter Input | | 83.3333 | Lbs/Hr |
| Water Wt % in | 40% | 0 | Lbs/Hr |

TABLE 12-continued

| Litter | | | | | | | | | |
|---|---|---|---|---|---|---|---|---|---|
| Sub Total | | 325.98 | | | | | | | |
| Minus | | | | | | | | | |
| Ash Output | | 16.58 | Lbs/Hr | | | | | | |
| Oil Output | | 77.03 | Lbs/Hr | 15.05 | Gal/Hr | | | | |
| Gas Output | | 205.16 | Lbs/Hr | 44.215 | SCFM | | | | |
| NH3 Out | | 10.85 | | | | | | | |
| Water Output | | 15 | Lbs/Hr | | | | | | |
| Residual Gas | | 1.36 | Lbs/Hr | | | | | | |
| Out | | 325.98 | | | | | | | |
| Mass Balance | | 0.00 | | | | | | | |
| | | | | Combustion | | | | | |
| Syngas | | 44.215 | SCFM | 642,002 | | | | | |
| NH3 * H2O | | 6.14 | SCFM | 172,967 | | | | | |
| Residual | | 0.02 | SCFM | 3,138 | | | | | |
| Overall Gas Flow Rate | | 50 | SCFM | | | | | | |
| | | | | 818,107 | | | | | |
| N2 in Sludge | 2.14 | H2 in Sludge | 0.06 | O2 in Sludge | 0.28 | C in Sludge | 0.33 | Ammonia Out | 10.85 Lb/Hr |
| N2 in Return Gas | 39.57 | H2 in return gas | 13.18 | O2 in return Gas | 35.61 | C in return Gas | 62.39 | | |
| N2 in Oil | 26.87 | H2 in Oil | 6.88 | O2 Oil | 8.15 | C in Gas | 39.48 | | |
| N2 in Gas | 90.4195 | H2 in Gas | 11.94 | O2 Water | 29.85 | C in Oil | 35.13 | Ammonia in Return Gas | 17.85 |
| N2 in Biomass | 20.95 | H2 in Water | 3.73 | O2 Gas | 62.40 | | | Combustion | 172,967 Btu/Hr |
| N2 in Ash | 0.78 | H2 in Air | 0.98 | O2 from Biomass | 4.97 | Carbon in Litter | 13.93 | Water in NH4OH | 15 Lbs/Hr |
| | 88.17 | | 23.53 | | 105.38 | | | | |
| Sludge % | 18.6 | | | Air Flow In SCFM | 14.66 | | | | |
| | | H2 in Biomass | 1.98 | | | | | Return Gas Flow SCFM | 18.00  3.10 |

| Input | H2 | O2 | Carbon | N2 | Output | H2 | O2 | Carbon | Nitrogen |
|---|---|---|---|---|---|---|---|---|---|
| Dry biomass | 1.98 | 4.97 | 13.93 | 20.95 | Oil | 6.88 | 8.15 | 35.13 | 26.87 |
| Water | 3.73 | 29.85 | 0.00 | 0.00 | Gas | 11.94 | 62.40 | 39.48 | 90.4195 |
| Air | 0.98 | 17.92 | 0.00 | 52.54 | Water | 1.64 | 13.11 | 0.00 | 0 |
| Return Gas | 13.18 | 35.61 | 62.39 | 39.57 | Ash | 0.65 | 4.69 | 1.72 | 1.53365 |
| NH3 | 3.1416 | | | 14.7084 | NH3 | 1.91 | | | 8.9404 |
| Sludge | 0.06 | 0.28 | 0.33 | 2.14 | Sludge | 0.06 | 0.28 | 0.33 | 2.14 |
| Total | 23.07 | 88.63 | 76.65 | 129.90 | | 23.07 | 88.63 | 76.65 | 129.90 |
| | | | | | Minus | | | | |
| Balance | 0.00 | 0.00 | 0.00 | 0.00 | | | | | |

| Energy Balance | | Btu/Lb | Total |
|---|---|---|---|
| Exothermic Produced | NH3 | 9,675.8 | 172,713.03 |
| | C10H22 | 4,263.0 | 262,706.71 |
| | CO2 | 3,847.5 | 132,938.73 |
| | CO | 1,697.8 | 108,136.87 |
| | Alcohol | 3,206.0 | 21,732.62 |
| | H2O | 7,605.00 | 151,859.11 |
| | | | 850,087.06 |
| Endothermic Consumed | | | |
| Heating Water | 1,080.00 | 36,269.99 | |
| Heating Air | 265.90 | 18,878.48 | |
| Decomposition of Water | 7,605.00 | 255,403.70 | |
| Water Gas/Lb | 21,016.00 | 395,906.13 | |
| H2 | | 706,458.29 | |

TABLE 12-continued

| | Wt % | Den Lb/gal | Component | Mole % | Weight % |
|---|---|---|---|---|---|
| Normal paraffins | 3.7 | 5.38 | Hydrogen | 47.681 | 5.820323581 |
| iso paraffins | 11.4 | 5.38 | Nitrogen | 25.982 | 44.0747598 |
| cyclo paraffins | 24.4 | 5.38 | Methane | 0.905 | 0.879004837 |
| mono aromatics | 0.9 | 6.5 | Carbon Monoxide | 18.305 | 31.04517334 |
| di aromatics | 3.6 | 6.5 | Carbon Dioxide | 6.32 | 16.84145828 |
| poly aromatics | 1.6 | 6.5 | Ethane | 0.182 | 0.331339134 |
| organic acids | 2.4 | 8.62 | Water | 0.439 | 0.478888205 |
| alcohols | 8.8 | 6.5 | Propane | 0.141 | 0.376435141 |
| aldehydes | 0.2 | 6.56 | Butane | 0.045 | 0.152617678 |
| amides | 1.9 | 9.66 | Pentane | 0 | 0 |
| amines | 3.4 | 8.42 | Acetaldehyde | 0 | 0 |
| esters | 0.5 | 8.16 | Acetone | 0 | 0 |
| indenes | 2.9 | 8.53 | Amylene | 0 | 0 |
| ketones | 3.7 | 6.58 | Cyclopentadiene | 0 | 0 |
| olefins | 11 | 5.17 | Cyclopentane | 0 | 0 |
| phenolics | 2.9 | 8.5 | Diethylamine | 0 | 0 |
| organo nitriles | 2.6 | 6.75 | Ether | 0 | 0 |
| halogen containing organics | 5.8 | 8.6 | Furfuran | 0 | 0 |
| oxygenates | 0.8 | 6.23 | Neo-hexane | 0 | 0 |
| others | 7.5 | 5.78 | Isoprene | 0 | 0 |
| | 100 | | Methyl formate | 0 | 0 |
| | | | Methyial | 0 | 0 |
| | | | Propylamine | 0 | 0 |
| | | | Propylamine(i) | 0 | 0 |
| | | | Propylene oxide | 0 | 0 |
| | | | | 100 | 100 |

Experiments show that the reformer of the present invention may provide output as follows: 2000 pounds of feedstock (1 ton) will produce approximately 6.4 barrels of oil plus approximately 63,000 Cubic feet of synthesis gas plus approximately 60 pounds of ash fertilizer. Essentially, one 5 gallon bucket of chicken litter will produce one 5 gallon bucket of oil (in addition to the gas and fertilizer).

6. Conclusion

Thus, the present reformer technology reforms any carbon-based waste material at the atomic level to produce a high volume of partially refined petroleum (with little or no sulfur), a hydrogen rich synthesis gas, and a solid ash that is classified as a fertilizer by the US Department of Agriculture. There are little to no harmful fugitive emissions. The technology is a fraction of the size and cost of existing waste-to-energy or waste-to-fuel technologies, and produces a much higher volume of valuable energy commodities. The subject reformer technology provides a low pressure, low-heat, continuous process that separates and reforms basic organic elements found in waste material into high value partially refined petroleum. The oil production facilities according to the present invention have intrinsically low operating costs, low capital costs, and high efficiency. Each reformer can provide the most economical method of transforming common organic material into valuable hydrocarbons that are refinery ready, have a hydrogen to carbon monoxide ratio of about 2.2:1, and have minimal or no sulfur. Feedstock conversion efficiency for 100 tons of feedstock produces more value than 1000 tons processed by existing gasification or pyrolysis technologies. Poultry litter, horse manure, cow manure, shredded tires, wood waste, switch grass, cafeteria waste, rice hulls, Medium-density fibreboard (MDF) sanding dust (with water added), lignite, gasifier ash, and municipal solid waste can be used as a feedstock for the reformer of the present invention successfully. Further, various feedstocks may be combined in various percentages in order to provide even more engineered oils, gasses, and fertilizers. It is estimated that the cost of producing a barrel of oil according to the present invention will be about $20-25 dollars US, which compares very favorably with other forms of oil production. The present invention produces hydrocarbons, such as aliphatics, paraffins, aromatics, specialty chemicals, fuel, and fuel & oil additives. The synthetic crude oil according to the preferred embodiments contains virtually no sulfur.

The individual components shown in outline or designated by blocks in the attached Drawings are all well-known in the gasification/refining arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patents and patent applications discussed above are hereby incorporated by reference into the Detailed Description of the Preferred Embodiments.

What is claimed is:

1. Apparatus converting chicken litter into oil, combustible gas, and ash fertilizer, comprising:
   a feed stock input configured to receive the chicken liter;
   a reformer coupled to the feed stock input and configured to provide oil, combustible gas, and ash fertilizer outputs, the reformer having (i) an outer wall, (ii) a reaction chamber with an inner wall disposed inside the outer wall, (iii) a combustible gas input, (iv) a scrubbing liquid input, (v) a fuel stirrer, (vi) an ash stirrer, (vii) an ash plate, (viii) an igniter, (ix) a combined liquid/gas output, and (x) electrical isolation structure configured to electrically isolate the ash plate from the inner wall;
   an ash output configured to output ash from a bottom of the reformer;
   at least one liquid/gas pump configured to carry the combined liquid/gas from the reformer liquid/gas output;
   at least one gas/liquid separator configured to receive the liquid/gas output from the at least one liquid/gas pump, and provide a substantially gas output and a substantially liquid output;
   at least one oil/water separator configured to receive the substantially liquid output from the at least one gas/liquid separator and provide a substantially water output and a substantially oil output; and
   at least one processor configured to control at least the feed stock input, a temperature of the reformer, the at least one liquid/gas pump, the at least one gas/liquid separator, and the at least one oil/water separator, the at least one processor controlling the temperature of the reformer so as to cause an electric current to flow along the inner wall and inward toward heated pyrolysis/reaction product within the reaction chamber.

2. The apparatus of claim 1, wherein the reformer is configured to process chicken litter having a moisture content of above about 25 percent by weight.

3. The apparatus of claim 1, further comprising plural cross members disposed within the reaction chamber and configured to separate portions of the feedstock, the plural cross members being coupled to the inner wall, and substantially electrically isolated from the fuel stirrer.

4. The apparatus of claim 1, wherein the at least one processor is configured to cause arcing in reaction products within the reaction chamber.

5. The apparatus of claim 4, wherein the at least one processor is configured to cause the arcing to disassociate at least one molecule into at least two atoms.

6. The apparatus of claim 5, wherein the at least one processor is configured to cause the substantially oil output to comprise hydrocarbon compounds produced in said arcing.

7. The apparatus of claim 1, wherein the at least one liquid/gas pump is configured to form at least a partial vacuum within the outer wall and above the reaction chamber.

8. The apparatus of claim 7, wherein the feed stock input comprises an air lock structure which is configured to prevent substantial loss of the at least a partial vacuum within the outer wall and above the reaction chamber.

9. The apparatus of claim 1, wherein the at least one processor is configured to cause formation of multiple layers of feedstock and reaction products within the reaction chamber, comprising at least: a feedstock layer; an electrolysis layer; a charcoal layer; a carbonate layer; and an ash layer.

10. The apparatus of claim 9, wherein the at least one processor is configured to cause the carbonate layer to comprise a plasma zone.

11. Apparatus converting feedstock into oil and fertilizer, comprising:
   a reaction chamber having a reaction zone;
   a feedstock input configured to provide feedstock to the reaction chamber;
   a burner configured to provide heat to an interior of the reaction chamber;
   a combustion fuel input configured to provide combustion fuel to the burner;
   at least one feedstock stirrer configured to stir feedstock within the reaction chamber;
   a fertilizer support disposed below the reaction chamber and configured to collect fertilizer from the reaction chamber, the fertilizer support being substantially electrically isolated from the reaction chamber by electrical isolation structure;
   at least one processor configured to control the feedstock input, the combustion fuel input, and the at least one feedstock stirrer to cause an electric current to flow from a wall of the reaction chamber to reaction products in the reaction zone;
   evacuation structure configured to evacuate reaction byproducts from above the reaction zone; and
   oil separation structure configured to separate oil from the evacuated reaction byproducts, and to provide an oil output.

12. The apparatus according to claim 11, further comprising gas separation structure configured to separate gas from the evacuated reaction byproducts, and to provide a gas output.

13. The apparatus of claim 12, wherein the combustion fuel input is configured to provide the combustion fuel from at least one output of the gas separation structure.

14. The apparatus according to claim 11, wherein the at least one processor is configured to control the evacuation structure to produce an oil comprising, substantially:
   0.2 to 15.0 percent by weight isoparaffins;
   0.1 to 15.0 percent by weight naphthenics;
   3.0 to 75.0 percent by weight mono-aromatics;
   0 to 40.0 percent by weight di-aromatics;
   0 to 15.0 percent by weight poly-aromatics;
   0.1 to 3.0 percent by weight acids;
   0 to 15.0 percent by weight alcohols;
   0.1 to 3.0 percent by weight aldehydes;
   0.1 to 7.0 percent by weight amines;
   0.1 to 3.0 percent by weight esters;
   0.1 to 7.0 percent by weight indenes;
   0.1 to 7.0 percent by weight ketones;
   0.1 to 30.0 percent by weight olefins; and
   0.1 to 11.0 percent by weight low level organic compounds.

15. The apparatus according to claim 11, wherein the at least one processor configured to cause a plasma zone to be formed of reaction products within the reaction zone.

16. The apparatus of claim 11, wherein the at least one processor is configured to cause arcing in reaction products within the reaction zone.

17. The apparatus of claim 16, wherein the at least one processor is configured to cause the arcing to disassociate at least one molecule into at least two atoms within the reaction zone.

18. The apparatus of claim 11, wherein the at least one processor is configured to cause formation of multiple layers of feedstock and reaction products within the reaction chamber, comprising at least: a feedstock layer; an electrolysis layer; a charcoal layer; a carbonate layer; and an ash layer.

19. The apparatus of claim 11, wherein the at least one processor is configured to control the evacuation structure to produce an oil comprising at least 75 percent aromatics.

20. The apparatus of claim 19, wherein the evacuation structure is configured to cause an upward airflow through the reaction zone.

21. The apparatus of claim 11, further comprising an outer wall disposed on an outside of the reaction chamber, and wherein the evacuation structure is configured to form at least a partial vacuum within the outer wall in an area above the reaction chamber.

22. The apparatus of claim 21, further comprising at least one liquid input configured to provide a liquid to the area above the reaction chamber.

23. The apparatus of claim 22, wherein the at least one liquid input is configured to provide the liquid from at least one output of the oil separation structure.

24. Feedstock conversion apparatus, comprising:
a reaction chamber having a wall;
an ash support configured to support ash reaction products and disposed below the reaction chamber, the support being substantially electrically isolated from the reaction chamber wall by electrical isolation structure;
a feedstock input configured to input feedstock to the reaction chamber;
a gas input configured to input gas to the reaction chamber; and
control structure configured to control at least (i) the feedstock input and (ii) the gas input, to cause reaction of the feedstock inside the reaction chamber, the control of the reaction being such as to induce a current flow from the reaction chamber wall into the feedstock within the reaction chamber to cause arcing within at least a portion of the feedstock in the reaction chamber.

25. The apparatus of claim 24, further comprising an upper chamber disposed above the reaction chamber, and wherein the control structure controls the reaction such that (i) solid carbon reaction products migrate downward through the reaction chamber toward the support, and (ii) gaseous and liquid hydrocarbon reaction products migrate upward through the reaction chamber into the upper chamber.

26. The apparatus according to claim 25, further comprising (i) liquid input structure configured to input liquid into the upper chamber, and (ii) a gas/liquid output structure configured to extract from the upper chamber gas/liquids containing the gaseous and liquid hydrocarbon reaction products migrating upward through the reaction chamber.

27. The apparatus according to claim 25, wherein the gas/liquid output structure is configured to form at least a partial vacuum in the upper chamber.

28. The apparatus according to claim 25, further comprising separation structure configured to extract oil and synthetic gas from the gas/liquids extracted from the upper chamber by the gas/liquid output structure.

29. The apparatus according to claim 24, wherein the control structure comprises (i) a least one processor, (ii) at least one stirrer disposed in the reaction chamber, (iii) at least one valve disposed to control the gas input.

* * * * *